(12) United States Patent
Arunachalam et al.

(10) Patent No.: US 10,470,008 B2
(45) Date of Patent: Nov. 5, 2019

(54) IMPACT PREVENTION USING MOBILE BEACONS

(71) Applicant: Industrial Scientific Corporation, Pittsburgh, PA (US)

(72) Inventors: Raghu Arunachalam, Pittsburgh, PA (US); L. Robert Crouthamel, Mars, PA (US)

(73) Assignee: Industrial Scientific Corporation, Pittsburgh, PA (US)

( * ) Notice: Subject to any disclaimer, the term of this patent is extended or adjusted under 35 U.S.C. 154(b) by 28 days.

(21) Appl. No.: 15/703,560

(22) Filed: Sep. 13, 2017

(65) Prior Publication Data
US 2018/0072223 A1    Mar. 15, 2018

Related U.S. Application Data

(63) Continuation of application No. 15/702,246, filed on Sep. 12, 2017.
(Continued)

(51) Int. Cl.
*B60Q 1/00* (2006.01)
*H04W 4/18* (2009.01)
(Continued)

(52) U.S. Cl.
CPC .............. *H04W 4/18* (2013.01); *B60Q 5/006* (2013.01); *B60Q 9/008* (2013.01); *G01C 21/206* (2013.01); *G01S 1/042* (2013.01); *G01S 1/68* (2013.01); *G01S 5/0036* (2013.01); *G01S 13/931* (2013.01); *G08B 21/22* (2013.01); *H04B 5/0031* (2013.01); *H04L 67/18* (2013.01);
(Continued)

(58) Field of Classification Search
CPC ................................ H04W 4/18; H04W 4/023
USPC .......... 340/435, 436, 438, 539.13, 540, 541, 340/539.12, 539.15
See application file for complete search history.

(56) References Cited

U.S. PATENT DOCUMENTS 5,727,758 A * 3/1998 Penza ................ B61L 23/06
246/124
6,917,300 B2 * 7/2005 Allen .................. G08G 1/20
340/539.13
(Continued)

FOREIGN PATENT DOCUMENTS

EP    2733502 A1    5/2014
WO   2017142847 A1   8/2017
WO   2018049406 A1   3/2018

OTHER PUBLICATIONS

PCT/US2017/051189, "Application Serial No. PCT/US2017/051189, International Search Report and the Written Opinion dated Dec. 4, 2017", 9 pages.
(Continued)

*Primary Examiner* — Tai T Nguyen
(74) *Attorney, Agent, or Firm* — GTC Law Group PC & Affiliates

(57) ABSTRACT

A system for impact prevention using mobile beacons includes a receiving device associated with a user, the receiving device comprising a receiver adapted to receive a beacon broadcast from one or more of a plurality of beacons, the beacon broadcast comprising informational data and a range of relevance, a processor, and an alarm, wherein when the processor determines that the receiving device is within the range of relevance, the alarm is activated.

13 Claims, 9 Drawing Sheets

Related U.S. Application Data

(60) Provisional application No. 62/393,238, filed on Sep. 12, 2016, provisional application No. 62/412,156, filed on Oct. 24, 2016.

(51) Int. Cl.

| | | |
|---|---|---|
| *H04W 4/80* | (2018.01) | |
| *H04L 29/08* | (2006.01) | |
| *H04W 4/02* | (2018.01) | |
| *H04W 4/04* | (2009.01) | |
| *B60Q 5/00* | (2006.01) | |
| *B60Q 9/00* | (2006.01) | |
| *G01S 13/93* | (2006.01) | |
| *H04B 5/00* | (2006.01) | |
| *G01C 21/20* | (2006.01) | |
| *G01S 1/04* | (2006.01) | |
| *G01S 1/68* | (2006.01) | |
| *G01S 5/00* | (2006.01) | |
| *G08B 21/22* | (2006.01) | |
| *H04W 64/00* | (2009.01) | |
| *H04W 4/021* | (2018.01) | |
| *H04W 4/029* | (2018.01) | |
| *H04W 4/90* | (2018.01) | |

(52) U.S. Cl.
CPC .............. *H04L 67/303* (2013.01); *H04W 4/02* (2013.01); *H04W 4/021* (2013.01); *H04W 4/023* (2013.01); *H04W 4/025* (2013.01); *H04W 4/029* (2018.02); *H04W 4/04* (2013.01); *H04W 4/80* (2018.02); *H04W 4/90* (2018.02); *H04W 64/003* (2013.01); *G01S 2013/9325* (2013.01); *G01S 2013/9342* (2013.01)

(56) References Cited

U.S. PATENT DOCUMENTS

| | | | |
|---|---|---|---|
| 6,963,278 B2* | 11/2005 | Frame .................. | B66C 15/045 340/539.22 |
| 7,167,082 B2* | 1/2007 | Stigall .................... | A41D 13/00 340/407.1 |
| 7,688,198 B2 | 3/2010 | Amidi | |
| 8,760,289 B2* | 6/2014 | Leppanen ............... | B66C 15/06 340/435 |
| 8,847,754 B2 | 9/2014 | Buchheim et al. | |
| 8,878,671 B2 | 11/2014 | Buchheim et al. | |
| 9,232,357 B2 | 1/2016 | Buchheim et al. | |
| 2001/0055988 A1 | 12/2001 | Blake et al. | |
| 2004/0002328 A1 | 1/2004 | Chandra et al. | |
| 2009/0311963 A1 | 12/2009 | Haverty | |
| 2010/0315230 A1 | 12/2010 | Kwon et al. | |
| 2013/0045684 A1 | 2/2013 | Linde et al. | |
| 2013/0291013 A1 | 10/2013 | Choi et al. | |
| 2014/0030982 A1 | 1/2014 | Cardona et al. | |
| 2014/0132411 A1 | 5/2014 | Buchheim et al. | |
| 2014/0370917 A1 | 12/2014 | Buchheim et al. | |
| 2015/0079942 A1 | 3/2015 | Kostka et al. | |
| 2015/0133170 A1 | 5/2015 | Buchheim et al. | |
| 2015/0181384 A1 | 6/2015 | Mayor et al. | |
| 2015/0193516 A1 | 7/2015 | Harb | |
| 2015/0327000 A1 | 11/2015 | Shin et al. | |
| 2016/0065719 A1 | 3/2016 | Park et al. | |
| 2016/0066154 A1 | 3/2016 | Shin | |
| 2016/0171486 A1 | 6/2016 | Wagner et al. | |
| 2016/0204879 A1 | 7/2016 | Niewczas et al. | |
| 2016/0323754 A1 | 11/2016 | Friday et al. | |
| 2017/0013450 A1 | 1/2017 | Ziv et al. | |
| 2017/0094693 A1 | 3/2017 | Law et al. | |
| 2017/0248681 A1 | 8/2017 | Johnson et al. | |
| 2017/0325067 A1 | 11/2017 | Greenberger | |
| 2017/0337528 A1 | 11/2017 | Hall et al. | |
| 2018/0025603 A1 | 1/2018 | Tyler et al. | |
| 2018/0074156 A1 | 3/2018 | Arunachalam et al. | |
| 2018/0074161 A1 | 3/2018 | Rosenbaum et al. | |
| 2018/0077521 A1 | 3/2018 | Arunachalam et al. | |
| 2018/0077545 A1 | 3/2018 | Arunachalam et al. | |
| 2018/0077546 A1 | 3/2018 | Arunachalam et al. | |
| 2018/0103339 A1 | 4/2018 | Roundtree et al. | |
| 2018/0206177 A1 | 7/2018 | Daoura et al. | |
| 2018/0313932 A1 | 11/2018 | Niewczas et al. | |

OTHER PUBLICATIONS

PCT/US2017/051189, "International Application Serial No. PCT/US2017/051189, International Preliminary Report on Patentability dated Mar. 21, 2019", ActiveBlu, 7 pages.

\* cited by examiner

| SMART BEACON APPLICATION 358 | BEACON FRAMEWORK 354 | API FOR RECEIVER HARDWARE 352 |

FIG. 3B

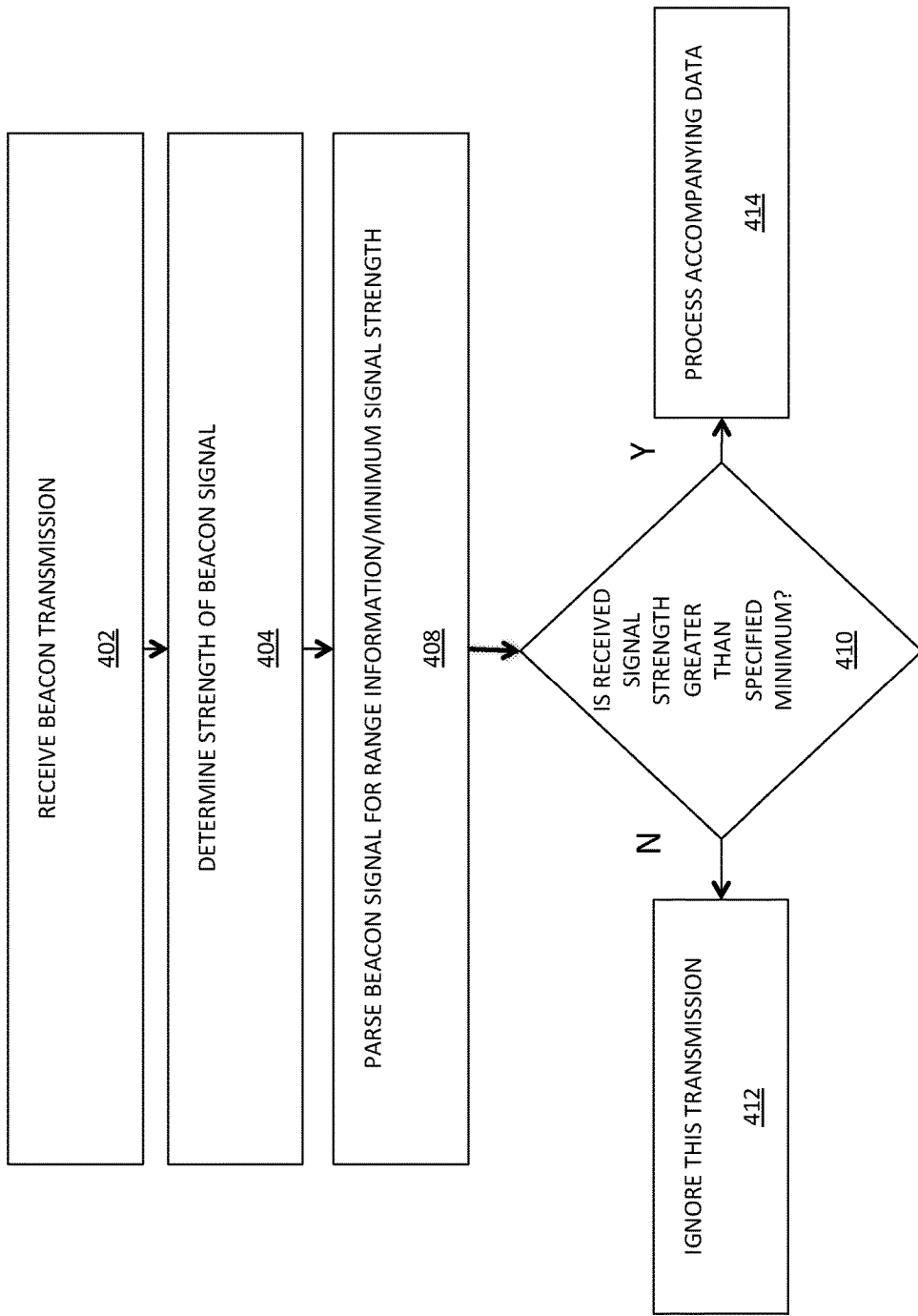

IMPACT PREVENTION USING MOBILE BEACONS

CLAIM TO PRIORITY

This application is a continuation of the following U.S. patent application which is incorporated by reference in its entirety: U.S. patent application Ser. No. 15/702,246, filed Sep. 12, 2017.

U.S. patent application Ser. No. 15/702,246 claims the benefit of the following applications, each of which is hereby incorporated by reference in its entirety: U.S. Ser. No. 62/393,238, filed Sep. 12, 2016 and U.S. Ser. No. 62/412,156, filed Oct. 24, 2016.

CROSS REFERENCE TO OTHER APPLICATIONS

This application is related to the following co-owned U.S. patent applications, each of which is incorporated by reference herein in its entirety: U.S. Ser. No. 15/491,311, entitled "Worker Safety System", filed Apr. 19, 2017; and U.S. Ser. No. 15/665,034, entitled "COMBUSTIBLE GAS SENSING ELEMENT WITH CANTILEVER SUPPORT", filed Jul. 31, 2017.

BACKGROUND

Field

The invention relates to the art of location and information transmittal and more particularly to a system of smart asset tags and data foraging devices designed to interact in challenging environments, including but not limited to an industrial environment, without the need for remote access to a server for additional data or processing.

Description of the Related Art

There are many situations where knowing the location of an asset (e.g. a person, piece of equipment, material and the like) is important but the environment presents challenges. For example, industrial environments may be large, indoor facilities constructed of metal and filled with various pieces of equipment or underground facilities with hazardous atmospheric environments. Further, industrial environments may include high levels of radio frequency noise due to equipment, further inhibiting signal reception. These types of environments may be challenging for typical positioning systems such as the satellite based Global Positioning Systems (GPS) as reception of satellite signals may be inhibited by the structure of the building or other environmental shielding. Cell phone based systems may use triangulation based on cell phone signal strength and direction as received by at least three cell phone towers. However, these systems suffer from some of the same drawbacks in terms of efficacy in an indoor environment.

Further, while these solutions may provide a somewhat accurate position outdoors on a map, remote positioning systems such as the cell phone system have no insight into the interior layout of the industrial facility and may only provide latitude and longitude rather than insight into an asset's location within a facility. This may necessitate an extra step requiring those wanting to take action based on location information to reference a map or database to convert latitude and longitude to an actionable location, such as "Building 1."

There are existing solutions for interior spaces based on triangulation or trilateration of signal strength using Wi-Fi access points or other RF based references. While this description refers to Wi-Fi access points, it should be understood that other RF-based references may be used. The use of triangulation/trilateration may be effective and, depending on the density and distribution of the Wi-Fi access points, may achieve high levels of accuracy. However, there may be disadvantages to this solution. To achieve high levels of accuracy, Wi-Fi access points must be densely distributed across a space. For example, to achieve accuracy of approximately +/−20 feet, the Wi-Fi access points must be positioned about every 50 feet. Each Wi-Fi access point may require wired infrastructure such as a power source, an internet cable and the like. Thus, installation may be expensive, particularly in industrial environments where power drops may need to be installed for each access point. For similar reasons of density and expense, RSSI fingerprinting is not preferred.

Moreover, the level of positional accuracy needed or desired may not be uniform throughout the space of interest. For the majority of a space, it may be sufficient to simply locate an asset as being present within the space. For example, industrial facilities such as manufacturing areas may be open areas where visibility is high and knowing which manufacturing area to look in for something may be sufficient information. However, for some portion of a space, such as an enclosed portion of the space, a high-security area, in proximity to hazardous equipment and materials and the like, a high degree of accuracy may be desired. The specificity of location information required can thus vary across the space based on interior features of the space. For this scenario, in addition to being expensive to install and run, a dense network of Wi-Fi access points may be overly precise in some areas of the space and insufficiently precise in others.

An emerging approach for high accuracy in both interior and exterior spaces is the use of beacons. However, for many of the existing beacon protocols, such as iBeacon, EddyStone, AltBeacon and the like, the protocol relies on a remote server to provide context for the beacon. The beacon signal may provide limited information such as a unique user identification (UUID) or URL and a power level at 1 meter. In order to determine whether any action is required, a receiving device calculates the distance between the receiving device and the beacon using received power vs. power at one meter and then transmits the UUID and distance to an external, possibly off-site, server to understand the context for that beacon and whether it is relevant for the receiver at its current location. Also, the system relies on the server to indicate what, if any, action may be required.

For example, a beacon may be positioned near a retail display. If a receiving device, such as a mobile phone, receives the beacon's signal, it sends the beacon's UUID to a remote server, such as a cloud-based server. The receiving device may calculate the distance between the receiving device and the beacon and transmit that distance together with the UUID. In other instances, the receiving device may transmit the received signal strength (RSSI) or similar signal strength indicator to the remote server, which may calculate the distance between the beacon and the receiving device. Once the remote server knows the UUID and the distance, it may, if the mobile phone is sufficiently close to the beacon and retail display (within two feet in this example), transmit a coupon to the mobile device. However, if there is a disruption in communication with the remote server, the system may not function as intended as the receiving device itself does not know how to respond to any particular UUID. Thus, for environments without connectivity to a remote server, this system has limited utility other than possibly for logging the UUIDs.

There remains an ongoing need for a low cost, low power location and information system capable of supporting multiple levels of location specificity and operable without the need of a remote server.

There are many situations where knowing the location and status of an asset (e.g. a piece of equipment, personal protective equipment (PPEs), material and the like) is important. Historically, inventory was counted by hand, providing information such as the total quantity of an asset in a given location at a given time. However, there was no good way to track differences in status (e.g. user, maintenance due, and the like) across the counted inventory or to know the location at other times.

More recently, bar code tags have been used to simplify the tracking of assets. For each asset to be tracked, a barcode label with a unique identifier is attached to the asset. On a remote system, there may be a database associating each unique identifier with information about the asset such as when it was purchased, when maintenance is due, and the like. During an inventory survey, each individual asset tag may be manually scanned using a barcode scanner, and the unique identifier uploaded to the data management system. The system may provide the individual who scanned the tag with information such as a description of the item, when it was purchased, when it is due for maintenance, instructions on the asset's use and the like. However, specialized equipment is required to print barcode labels and the barcode label's may become smudged or obscured in some environments. In those cases the bar code label would have to be reprinted and reapplied. To overcome some of the deficiencies of barcode labels, there are systems being developed that use RFID tags or near field communication (NFC) tags in a fashion similar to barcode tags. The system works in a similar way where the tag provides a unique identifier, which may be read using an appropriate reader and the unique identifier used to look up corresponding information. However, these methods still require that each asset be individually handled and scanned to read the unique identifier. Further, if there is a change in the status of an asset, for example a helmet is hit, there is no way to know that the helmet has been impacted and may need to be replaced. There is no automatic way of updating the material on the remote asset management system with the new information. Alternatively, if an asset needs to be recalled all pieces must be scanned to identify the recalled asset.

In some high-end pieces of equipment, there may be some data logging done which is uploaded to an asset management system periodically. For example, a gas detector may record measured gas levels throughout a shift and then upload the logged data when the equipment is docked at the end of the shift. Other equipment may measure body temperature, noise levels, heat stress, and the like. However, for these systems, there is still the necessity for an individual to initiate extraction of the information such as placing the item in a dock or initiating an NFC transfer of data. Until that is done, there is no way of knowing that if the status of a device has changed. Some high-end equipment may have limited 2-way communication built into the equipment that allows it to directly communicate with the cloud. The Self Contained Breathing Apparatus (SCBA) equipment is one such example. However such a scheme may not be viable for lower cost assets such a helmets, harnesses etc. where the cost for dedicated connectivity to the cloud may be too expensive.

There remains an ongoing need for a low cost, low overhead asset management system that is capable of providing tracking of items, without the need for individual initiated interactions with each asset to be tracked or extensive new infrastructure.

All documents mentioned herein are hereby incorporated in their entirety by reference. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context.

SUMMARY

The present disclosure describes a system, the system according to one disclosed non-limiting embodiment of the present disclosure can include a plurality of beacons, wherein each beacon broadcasts a message including informational data and data regarding a range of relevance, where each beacon may include a transmitter, a processor, a memory and a power source and wherein when a receiving device determines it is within the range of relevance broadcasted by the beacon, it attends to the informational data. Data regarding the range of relevance may include an indication of a minimum received signal strength. The minimum received signal strength may include a received signal strength indicator (RSSI) or a received channel power indicator (RCPI). The determination of whether the receiving device is within the range of relevance is determined locally by the receiving device. At least one of the plurality of beacons may also include a sensor or an input port for sensor data. The informational data may include the sensor data. The at least one of the plurality of beacons alters the informational data based on the sensor data. The receiving device is a mobile device. Each beacon is associated with one of a fixed location, a mobile asset or a second receiving device in the same location. Each beacon may broadcast continuously, periodically, or on a schedule. The plurality of beacons may broadcast with a mix of periodic and scheduled broadcasts. Each beacon may broadcast at least two messages sequentially. The at least two messages may have different ranges of relevance. Each beacon may broadcast multiple informational data in a sequence. The receiving device may further include an indicator, such as a light, a speaker or an actuator. Each beacon may be mobile and broadcasts user information including one of user name, user identification, user authorization or user safety equipment. The beacon may be updated using a mobile device having an NFC or a BLE capability. At least one of the plurality of beacons may also include a protective enclosure providing protection from dust or water. The protective enclosure may be intrinsically safe.

The present disclosure describes a beacon, the beacon according to one disclosed non-limiting embodiment of the present disclosure can include a transmitter adapted to broadcast a message including informational data and data regarding a range of relevance and a memory, wherein when a receiving device determines it is within the range of relevance broadcast by the beacon, it attends to the informational data broadcast by the beacon. The beacon may be associated with a real-time sign and the message relates to information presented by the real-time sign.

The present disclosure describes a method, the method according to one disclosed non-limiting embodiment of the present disclosure can include receiving a beacon broadcast resulting in a received beacon broadcast, wherein the beacon broadcast may include a range of relevance and informational data, determining a strength of the received beacon broadcast, comparing the range of relevance with the strength of the received beacon broadcast and identifying the beacon broadcast as relevant if the strength of the received beacon broadcast exceeds the range of relevance. A further embodiment of any of the foregoing embodiments of the present disclosure may also include averaging determined strength for a plurality of received beacon broadcasts from a particular beacon for comparison with the range of relevance. The range of relevance may include an indication of minimum received signal strength. A further embodiment of any of the foregoing embodiments of the present disclosure may include situations wherein the indication of minimum received signal strength may be a received signal strength indicator (RSSI) or a received channel power indicator (RCPI).

The present disclosure describes a method, the method according to one disclosed non-limiting embodiment of the present disclosure can include receiving a plurality of beacon broadcasts, resulting in a plurality of received beacon broadcasts, wherein each beacon broadcast may include a range of relevance and informational data, determining a strength of each received beacon broadcast of the plurality of beacon broadcasts, comparing the range of relevance with the strength of each received beacon broadcast of the plurality of received beacon broadcasts, for each received beacon broadcast of the plurality of beacon broadcasts, identifying the received beacon broadcast as relevant if the strength of the received beacon broadcast exceeds the range of relevance and prioritizing the relevant received beacon broadcasts based on the range of relevance. Received beacon broadcasts having a smaller range of relevance may be more highly prioritized than received beacon broadcasts having a relatively larger range of relevance. The range of relevance may include an indication of minimum received signal strength. The indication of minimum received signal strength may be a received signal strength indicator (RSSI) or a received channel power indicator (RCPI).

The present disclosure describes a system, the system according to one disclosed non-limiting embodiment of the present disclosure can include at least one receiving device, the receiving device can include a receiver adapted to receive a beacon broadcast from one or more of a plurality of beacons, resulting in one or more received beacon broadcasts, a processor, a memory and a smart beacon application, wherein, for each received beacon broadcast which includes informational data and data regarding a range of relevance for that beacon, the smart beacon application: 1) determines whether the beacon is relevant by comparing a strength of the received beacon broadcast to the range of relevance in the beacon broadcast, and 2) creates a list of relevant beacons. The at least one receiving device may be one of a laptop, a smart phone or a tablet. The at least one receiving device may be a smart identification badge. The at least one receiving device may also include a piece of personal protective equipment. The at least one receiving device may be one of a hearing protection, an eye protection, a protective footwear, a gas mask, a respirator, a harness, a lighting device, an exposure tracker, a hardhat, or a fall arrest device, or a tool, a saw, a gas sensor, a portable environmental sensing device, a gas detection instrument, a thermal detector, a flame detector, a chemical, biological, radiological, nuclear, and explosives (CBRNE) detector, a chemical detection instrument, or an industrial monitoring equipment. If a broadcast from a beacon on the list of relevant beacons is not received over a predetermined number of scans, the beacon may be removed from the list of relevant beacons. If a beacon on the list of relevant beacons is determined to not be relevant for a predetermined number of consecutive scans, it may be removed from the list of relevant beacons. A beacon must be determined to be relevant for a predetermined number of consecutive scans to be added to the list of relevant beacons. The at least one receiving device may be in electronic communication with one of a sensor, a piece of equipment, a smart identification badge, or a remote server.

The present disclosure describes a system, the system according to one disclosed non-limiting embodiment of the present disclosure can at least one receiving device, where the receiving device can include a receiver adapted to receive a beacon broadcast from one or more of a plurality of beacons, resulting in one or more received beacon broadcasts, a processor, a memory and a smart beacon application, wherein, for each received beacon broadcast that includes informational data and data regarding a range of relevance for that beacon, the smart beacon application calculates a normalized average strength of the received beacon broadcast over a predetermined number of samples, and determines whether the beacon is relevant by comparing the normalized average strength of the received beacon broadcast to the range of relevance in the beacon broadcast, and creates a list of relevant beacons. The smart beacon application may further identify a best beacon for identifying a location (a site beacon) based on a highest normalized average strength of the received beacon broadcast for those beacons whose informational data may include location information. If a new beacon whose informational data includes location information is identified as having a higher normalized average strength of the received beacon broadcast than the site beacon, the normalized average strength of the received beacon broadcast of the new beacon must exceed the normalized average strength of the received beacon broadcast of the site beacon by a predetermined margin in order to become a new site beacon. The at least one receiving device may be one of a laptop, a smart phone or a tablet. The at least one receiving device is a smart identification badge. The at least one receiving device may also include a piece of personal protective equipment. The at least one receiving device may be one of a hearing protection, an eye protection, a protective footwear, a gas mask, a respirator, a harness, a lighting device, an exposure tracker, a hardhat, or a fall arrest device, a tool, a saw, a gas sensor, a portable environmental sensing device, a gas detection instrument, a thermal detector, a flame detector, a chemical, biological, radiological, nuclear, and explosives (CBRNE) detector, a chemical detection instrument, or an industrial monitoring equipment. If a broadcast from a beacon on the list of relevant beacons is not received over a predetermined number of scans, the beacon is removed from the list of relevant beacons. If a beacon on the list of relevant beacons is determined to not be relevant for a predetermined number of consecutive scans, it is removed from the list of relevant beacons. A beacon must be determined to be relevant for a predetermined number of consecutive scans to be added to the list of relevant beacons. The at least one receiving device may be in electronic communication with one of a sensor, a piece of equipment, a smart identification badge, or a remote server.

The present disclosure describes a system, the system according to one disclosed non-limiting embodiment of the present disclosure can include at least one receiving device, where the receiving device may include a receiver adapted to receive a beacon broadcast from one or more of a plurality of beacons resulting in one or more received beacon broadcasts, a processor, a memory and a smart beacon application, wherein, for each beacon that broadcasts a message including informational data and data regarding a range of relevance for the beacon, the smart beacon application calculates an average strength of the received beacon broadcasts from that beacon over a predetermined number of samples, and determines whether that beacon is relevant by comparing, the average strength of the received beacon broadcasts to the range of relevance in that beacon broadcast, and creates a list of relevant beacons. The smart beacon application may further identify a best beacon for identifying a location (a site beacon) based on a highest average strength of the received beacon broadcast for those beacons whose informational data includes location information. The at least one receiving device may be one of a laptop, a smart phone or a tablet. The at least one receiving device may be a smart identification badge. The at least one receiving device may also include a piece of personal protective equipment. The at least one receiving device may be one of a hearing protection, an eye protection, a protective footwear, a gas mask, a respirator, a harness, a lighting device, an exposure tracker, a hardhat, or a fall arrest device, a tool, a saw, a gas sensor, a portable environmental sensing device, a gas detection instrument, a thermal detector, a flame detector, a chemical, biological, radiological, nuclear, and explosives (CBRNE) detector, a chemical detection instrument, or an industrial monitoring equipment. If a broadcast from a beacon on the list of relevant beacons is not received over a predetermined number of scans, the beacon is removed from the list of relevant beacons. If a beacon on the list of relevant beacons is determined to not be relevant for a predetermined number of consecutive scans, it is removed from the list of relevant beacons. A beacon must be determined to be relevant for a predetermined number of consecutive scans to be added to the list of relevant beacons. The at least one receiving device may be in electronic communication with one of a sensor, a piece of equipment, a smart identification badge, or a remote server.

The present disclosure describes a method, the method according to one disclosed non-limiting embodiment of the present disclosure can include sensing a characteristic of a personal protective equipment, resulting in a sensed characteristic, providing the sensed characteristic to a smart asset tag and broadcasting the sensed characteristic and an ID of the personal protective equipment using a beacon of the smart asset tag. A further embodiment of any of the foregoing embodiments of the present disclosure may include updating a status of the personal protective equipment in an asset management system using the sensed characteristic. A further embodiment of any of the foregoing embodiments of the present disclosure may include enabling a user of the asset management system to review the sensed characteristic, edit data related to the personal protective equipment, input an instruction for the smart asset tag, or input an instruction for one or more data foraging devices using a supervisory application. A further embodiment of any of the foregoing embodiments of the present disclosure may include communicating an input instruction from the supervisory application to the smart asset tag. The input instruction may include issuing an alert. The alert may be a visual alert, an audible alert or a haptic alert. The instruction for the one or more data foraging devices may be one or more of notifying a user of a data foraging device when the smart asset tag is detected or notifying the user of the data foraging device to relocate the personal protective equipment associated with the smart asset tag. Relocating the personal protective equipment may include taking the personal protective equipment for a maintenance, replacing the personal protective equipment, or taking the personal protective equipment for an inventory verification. Notifying the user may include a visual alert, an audible alert or a haptic alert. The visual alert may include an instruction to the user of the data foraging device.

The present disclosure describes a system, the system according to one disclosed non-limiting embodiment of the present disclosure can include a smart asset tag associated with an asset, where the smart asset tag may include a beacon, wherein the beacon transmits a message including a sensed characteristic of the asset and an asset ID and an alert mechanism, a data foraging device in communication with the smart asset tag and a remote server and a supervisory application on the remote server. The data foraging device communicates the sensed characteristic and the asset ID to the supervisory application on the remote server. The supervisory application may be configured to enable a user or a supervisor of the supervisory application to review the sensed characteristic, edit data related to the asset, input an instruction for the smart asset tag, input an instruction for one or more data foraging devices. The instruction for the one or more data foraging devices may be one or more of notifying a user of the data foraging device when the smart asset tag is detected or notifying the user of the data foraging device to relocate the asset associated with the smart asset tag. Relocating the asset may include taking the asset for a maintenance, replacing the asset, or taking the asset for an inventory verification. Notifying the user may include a visual alert, an audible alert or a haptic alert. The visual alert may include an instruction to the user of the data foraging device.

The present disclosure describes a method including receiving assignment information at a safety device when an NFC radio of the safety device is brought in proximity to at least one of a plurality of NFC tags, the plurality of NFC tags programmed with one or more of an operator authorization level and a location assignment; receiving a broadcasted operator authorization level required for an operator at the safety device; determining if the operator authorization level corresponds to the broadcasted operator authorization level; and transmitting a request for access if the operator authorization level corresponds to the broadcasted operator authorization level. Access may be granted remotely or an access passcode may be sent back to the operator.

The present disclosure also describes a method including receiving assignment information at a safety device when an NFC radio of the safety device is brought in proximity to at least one of a plurality of NFC tags, the plurality of NFC tags programmed with one or more of an operator authorization level and a location assignment; receiving a broadcasted operator authorization level required for an operator at the safety device; determining if the operator authorization level corresponds to the broadcasted operator authorization level; and granting or denying a request for access based on if the operator authorization level corresponds to the broadcasted operator authorization level.

The present disclosure also describes a method including receiving assignment information at a safety device when an NFC radio of the safety device is brought in proximity to at least one of a plurality of NFC tags, the plurality of NFC tags programmed with one or more of an operator authorization level and a location assignment; receiving a broadcasted operator authorization level required for an operator at the safety device; determining if the operator authorization level corresponds to the broadcasted operator authorization level; and triggering an alarm on the safety device if the operator authorization level does not correspond to the broadcasted operator authorization level. The alarm may be audible, visual, haptic, or a combination thereof.

The present disclosure describes a method comprising receiving a broadcasted operator authorization level for an operator at a safety device, wherein the broadcasted operator authorization level identifies an operator authorization level required to process a beacon broadcast, wherein the beacon broadcast comprises informational data and a range of relevance of the informational data; identifying, at the safety device, the beacon broadcast as relevant if a strength of the beacon broadcast exceeds the range of relevance; determining if the operator authorization level of the operator corresponds to the broadcasted operator authorization level; and processing the beacon broadcast if the operator authorization level of the operator corresponds to the broadcasted operator authorization level. The method further includes triggering an alert on the safety device if the operator authorization level does not correspond to the broadcasted operator authorization level. The alert may be an audible alert, a visual alert, a haptic alert, or a combination thereof.

The present disclosure describes a method including receiving a beacon broadcast, wherein the beacon broadcast comprises a range of relevance and informational data regarding an availability or a status of a safety item; identifying the beacon broadcast as relevant if a strength of the beacon broadcast exceeds the range of relevance; and presenting the informational data regarding the safety item on a user device if the beacon broadcast is identified as being relevant. The method further includes triggering an alert on the safety item when a user selects the safety item on the user device. The safety item may be one or more of an automatic external defibrillator (AED), an eyewash station, an emergency lab shower, a fire extinguisher, a chemical shower, and a sorbent. The method may further include triggering presentation of additional informational data regarding the safety item when a user selects the safety item on the user device. Triggering may involve receiving an additional beacon broadcast with the additional informational data when the user selects the safety item on the user device.

The present disclosure describes a beacon system, the beacon system according to one disclosed non-limiting embodiment of the present disclosure can include a beacon, the beacon including a transmitter, a processor, a sensor for collecting sensor data, and a memory, wherein the beacon broadcasts a beacon message including informational data based on a value of the sensor data and data regarding a range of relevance. The beacon message may vary based on the value of the sensor data. The beacon may broadcast the beacon message continuously when the value of the sensor data exceeds a specified value. The beacon may broadcast the beacon message when the value of the sensor data changes. The informational data includes the sensor data and the beacon broadcasts in near real time. The sensor data may be one of a temperature, a humidity, an atmospheric pressure, an altitude, a concentration of a specific gas in an atmosphere, an airflow, a noxious odor, or an operational status of a piece of equipment. The informational data may include a warning, an information about required personal protective equipment, an evacuation instruction, a required authorization level, or the value of the sensor data. The sensor data indicates that a laser is active and the informational data may include information regarding a protective eye gear. A further embodiment of any of the foregoing embodiments of the present disclosure may also include a receiving device. The receiving device may include an alarm adapted to be triggered by the beacon message.

The present disclosure describes a beacon system, the beacon system according to one disclosed non-limiting embodiment of the present disclosure can include a beacon where the beacon includes a transmitter a computer processor an input port for receiving sensor data from a sensor and a memory, wherein the beacon a beacon message including informational data based on a value of the sensor data and data regarding a range of relevance. The sensor may be attached to a piece of equipment and provides equipment status data. The equipment status data may include one of an operational status, a fault alert, a time until maintenance is due, a recent user, a recent safety or gas event, an environmental information, a calibration status, and a calibration instruction. The beacon may broadcast the beacon message continuously when the value of the sensor data exceeds a specified value. The beacon may broadcast the beacon message when the value of the sensor data changes. The informational data varies based on the value of the sensor data. The informational data includes the sensor data and the beacon broadcasts in near real time. The sensor data may be one of a temperature, a humidity, an atmospheric pressure, an altitude, a concentration of specific gas in an atmosphere, an airflow, a noxious odor, or an operational status of a piece of equipment. The informational data may include a warning, an information about required personal protective equipment, an evacuation instruction, a required authorization level, or the value of the sensor data.

The present disclosure describes a system, the system according to one disclosed non-limiting embodiment of the present disclosure can include a receiving device associated with a user, the receiving device may include a receiver adapted to receive a beacon broadcast from one or more of a plurality of beacons, the beacon broadcast including data regarding an impact danger and a range of relevance, a processor and an alarm, wherein when the processor determines that the receiving device is within the range of relevance, the alarm is activated. One of the plurality of beacons may be associated with a mobile object. The mobile object may be one of a vehicle, a forklift, a piece of moving equipment, or a moving portion of a machine. The beacon may be located at a leading edge of the mobile object. The alarm is one or more of an audible notification, a visual notification, and a haptic notification.

The present disclosure describes a method, the method according to one disclosed non-limiting embodiment of the present disclosure can include receiving, on a receiver associated with a user, a beacon broadcast message, the beacon broadcast message including data regarding an impact danger and data regarding a range of relevance for the beacon broadcast message, determining if the receiver associated with the user is within the range of relevance for the beacon broadcast message, wherein when the receiver associated with the user determines it is within the range of relevance for the beacon broadcast message, alerting the user to the impact danger. A further embodiment of any of the foregoing embodiments of the present disclosure may include situations wherein alerting the user is accomplished using a haptic alert, an audible alert, a visual alert or a combination of visual, audible and visual alerts. A further embodiment of any of the foregoing embodiments of the present disclosure may also include broadcasting, using a beacon on a mobile object, a broadcast message including data regarding the impact danger and data regarding the range of relevance. A further embodiment of any of the foregoing embodiments of the present disclosure may include situations wherein the mobile object is one of a vehicle, a forklift, a piece of moving equipment, or a moving portion of a machine. A further embodiment of any of the foregoing embodiments of the present disclosure may include situations wherein the beacon is located at a leading edge of the mobile object.

The present disclosure describes a system, the system according to one disclosed non-limiting embodiment of the present disclosure can include a beacon associated with a mobile object, wherein the beacon broadcasts warning data about the mobile object and a range of relevance and a speedometer that senses a speed of the mobile object, wherein when the speedometer senses the speed above a threshold, the beacon broadcasts warning data about the mobile object with a new range of relevance.

The present disclosure describes a system, the system according to one disclosed non-limiting embodiment of the present disclosure can include a mobile receiving device, the mobile receiving device can include a receiver adapted to receive a beacon broadcast from one or more of a plurality of beacons, each beacon broadcast including informational data and a range of relevance, a processor, and a server adapted to communicate with the mobile receiving device, wherein, if the mobile receiving device determines it is within the range of relevance broadcast by one of the plurality of beacons, the mobile receiving device communicates received informational data associated with the range of relevance and receipt information to the server. Receipt information may include one or more of a location of the mobile receiving device upon receiving the beacon broadcast, a time the beacon broadcast was received, and a date the beacon broadcast was received. The mobile receiving device may store the informational data the receipt information prior to communicating them to the server. The server may communicate an acknowledgement of receipt of the informational data and the receipt information to the mobile receiving device. The mobile receiving device may transmit the acknowledgement of the receipt of the informational data and the receipt information. One or more of the plurality of beacons may be associated with an asset, a personal protective equipment or a tool. The informational data may be one or more of an asset identification, an asset type, a date of last calibration, data collected by an asset, an operational status, a fault alert, a time until a maintenance is due, a list of recent users, a list of recent safety events, a list of recent gas events, a video on how to use the asset, an instruction on a maintenance of the asset, and an instruction on a calibration of the asset. The server may include an asset database. At least one of the plurality of beacons may include a module adapted to receive a communication from the mobile receiving device, wherein that beacon changes informational data in the beacon broadcast or a frequency of broadcast upon receiving the acknowledgement of the receipt of the informational data. The change in informational data in the beacon broadcast or the frequency of broadcast may include a cessation of transmission until that beacon determines that it has been moved or a set period of time has elapsed. A further embodiment of any of the foregoing embodiments of the present disclosure may also include a supervisory application adapted to send an instruction to one or more of the plurality of beacons or the mobile receiving device. The instruction may include determining a last known location of an asset associated with that beacon, indicating that the asset should be brought in from a field, or altering the informational data broadcast by that beacon.

The present disclosure describes a system, the system according to one disclosed non-limiting embodiment of the present disclosure can include receiving a broadcast message including informational data regarding an asset on a mobile device, transmitting the informational data and data regarding a receipt of the broadcast message to an asset management server, identifying data regarding the asset in an asset database on the asset management server, and upon identifying differences in the data in the asset database and the data regarding the receipt of the broadcast message, updating the data regarding the asset in the asset database.

The present disclosure describes a system, the system according to one disclosed non-limiting embodiment of the present disclosure can include a beacon, wherein the beacon broadcasts a message including informational data and data regarding a range of relevance, the beacon may include a transmitter, a receiver, a processor and a sensor or a sensor input, wherein the beacon scans for a presence of a receiving device and begins broadcasting the message when the presence is detected. The beacon's scans may occur continuously, periodically, at scheduled intervals or when a certain condition is met. Upon successful connection with the receiving device, the beacon may stop broadcasting. Upon a detection of a state change with the sensor or sensor input, the beacon may resume scans. A frequency of scanning is dependent upon a severity of the state change. The state change may be at least one of a movement of the beacon, a fall detection, a temperature crossing a threshold, a gas over limit alert, an NFC activation, an ambient light level, or a detection of a wearing of a personal protective equipment. A cloud server may be in communication with the receiving device, wherein the receiving device transmits an acknowledgment to the beacon which may include contact data regarding a date or a time of a last successful communication between the receiving device and the cloud server. The receiving device may transmit one of the informational data and an indication that the beacon broadcasted the informational data to the cloud server. If the cloud server does not receive a subsequent transmission from the receiving device with one of the informational data and the indication within a given time interval, an alert may be sent to a third party. The beacon may rank order the receiving device among a plurality of receiving devices it has identified previously on expected connectivity to the cloud server based on the date or the time of the last successful communication between the receiving device and the cloud server. When there is an alert associated with the beacon, the beacon may contact the plurality of receiving devices in a rank order of expected connectivity. The alert may be a lone worker alert. The beacon may broadcast a message including informational data and data regarding a range of relevance, the beacon may include a transmitter, a receiver and a processor, wherein the beacon scans for a presence of a receiving device and begins broadcasting the message and the data regarding the range of relevance when the presence is detected. A further embodiment of any of the foregoing embodiments of the present disclosure may also include a cloud server in communication with the receiving device, wherein the receiving device transmits an acknowledgment to the beacon including contact data regarding a date or a time of a last successful communication between the receiving device and the cloud server. The receiving device may transmit one of the informational data and an indication that the beacon broadcasted the informational data to the cloud server. If the cloud server does not receive a subsequent transmission from the receiving device with one of the informational data and the indication within a given time interval, an alert may be sent to a third party.

The present disclosure describes a system, the system according to one disclosed non-limiting embodiment of the present disclosure can include a beacon which may include a transmitter that broadcasts a message that includes informational data and data regarding a range of relevance of the informational data, a processor, a receiver and a sensor or a sensor input, wherein upon detection of the beacon by a mobile receiving device, a connection is established between the beacon and the mobile receiving device to share at least informational data prior to terminating the connection. Upon the connection with the mobile receiving device being successfully completed, the beacon may stop broadcasting. Upon detection of a state change with the sensor or the sensor input, resulting in a detected state change, the beacon may make one or more connection attempts to connect to the mobile receiving device or a new mobile receiving device. The connection attempts occur continuously, periodically, at scheduled intervals or when a certain condition is met. A frequency of connection attempts may be dependent upon a severity of the detected state change. The state change may be at least one of a movement of the beacon, a fall detection, a temperature crossing a threshold, a gas over limit alert, an NFC activation, an ambient light level, or a detection of a wearing of a personal protective equipment. A further embodiment of any of the foregoing embodiments of the present disclosure may also include a cloud server in communication with the mobile receiving device, wherein the mobile receiving device transmits an acknowledgment to the beacon including data regarding a date or a time of a last successful communication between the mobile receiving device and the cloud server. The mobile receiving device may transmit one of the informational data and an indication that the beacon broadcasted the informational data to the cloud server. If the cloud server does not receive a subsequent transmission from the mobile receiving device with one of the informational data and the indication within a given time interval, an alert may be sent to a third party. The beacon may rank order the mobile receiving device among a plurality of mobile receiving devices it has identified previously on expected connectivity to the cloud server based on the date or the time of the last successful communication between the mobile receiving device and the cloud server. When there is an alert associated with the beacon, the beacon contacts the plurality of mobile receiving devices in a rank order of expected connectivity. The alert may be a lone worker alert.

The present disclosure describes a system, the system according to one disclosed non-limiting embodiment of the present disclosure can include a smart asset tag configured to generate a random data ID, associate the generated data ID with data resulting in a data ID and an associated data, and broadcast both the data ID and the associated data together, the smart asset tag may include a beacon, a receiver, and a processor. The system may also include a data foraging device wherein the data foraging device is configured to receive and store a received data ID and a received associated data and then transmit the received associated data to a cloud server, the data foraging device may include a transmitter, a receiver, and a processor, wherein, the data foraging device, upon receiving a confirmation of receipt of the received associated data from the cloud server, begins transmitting the received data ID for the received associated data, wherein, the smart asset tag, upon detecting a transmission of the data ID associated with the data it is broadcasting, ceases broadcasting the associated data. The data foraging device may further include a cellular communications module or a Wi-Fi communications module. The data foraging device may communicate with the cloud server using the cellular communications module or the Wi-Fi communications module. When the smart asset tag ceases broadcasting the associated data, the smart asset tag may do one of: go silent, broadcast information about an asset, broadcast information about the smart asset tag or broadcast new data associated with a new random data ID for communication to the cloud server. The smart asset tag may also transmit data regarding a range of relevance of the associated data. The data foraging device may determine whether it is within the range of relevance broadcast by the smart asset tag prior to transmitting the data to the cloud server. If the data foraging device determines that it is not within the range of relevance it may not transmit the data to the cloud server. The data foraging device may transmit the data ID continuously, periodically, at scheduled intervals or as one of a list of random data IDs. Each of the plurality of data foraging devices may limit transmission of the data ID to a location where the data and data ID were initially received.

The present disclosure describes a method, the method according to one disclosed non-limiting embodiment of the present disclosure can include generating a random data ID by a processor of a beacon, associating said data ID with data resulting in an associated data, broadcasting, by the beacon, both the data ID and the associated data and processing, by the beacon, a plurality of received messages from a plurality of data foraging devices, wherein upon detecting, in the plurality of received messages, a transmission of the data ID associated with the data being broadcast, broadcasting is ceased. A further embodiment of any of the foregoing embodiments of the present disclosure may include situations wherein each of the plurality of data foraging devices are configured to receive the broadcast data ID and the associated data, store the random data ID and transmit the associated data to a cloud server. A further embodiment of any of the foregoing embodiments of the present disclosure may include situations wherein, each of the plurality of data foraging devices, upon receiving confirmation of receipt of data from the cloud server, begin transmitting the random data ID for that associated data. A further embodiment of any of the foregoing embodiments of the present disclosure may include situations wherein each of the plurality of data foraging devices includes a cellular communications module or a Wi-Fi communications module. A further embodiment of any of the foregoing embodiments of the present disclosure may include situations wherein each of the plurality of data foraging devices communicates with the cloud server using the cellular communications module or the Wi-Fi communications module. A further embodiment of any of the foregoing embodiments of the present disclosure may include situations wherein, when the beacon ceases broadcasting the data, the beacon one or more of: goes silent, broadcasts information about an asset, broadcasts information about the beacon, and broadcasts new data associated with a new random data ID. A further embodiment of any of the foregoing embodiments of the present disclosure may include situations wherein broadcasting includes broadcasting a range of relevance of the data. A further embodiment of any of the foregoing embodiments of the present disclosure may include situations wherein each of the plurality of data foraging devices determines whether it is within the range of relevance broadcast by the beacon prior to transmitting the data to a cloud server. A further embodiment of any of the foregoing embodiments of the present disclosure may include situations wherein if each of the plurality of data foraging devices determines that it is not within the range of relevance, it does not transmit the data to the cloud server. A further embodiment of any of the foregoing embodiments of the present disclosure may include situations wherein each of the plurality of data foraging devices transmits the random data ID continuously, periodically, at scheduled intervals or as one of a list of random data IDs. A further embodiment of any of the foregoing embodiments of the present disclosure may include situations wherein each of the plurality of data foraging devices limits transmission of the random data ID to a location where the data and the random data ID were initially received.

The present disclosure describes a system, the system according to one disclosed non-limiting embodiment of the present disclosure can include a piece of personal protective equipment that uses a consumable, the piece of personal protective equipment can include a smart asset tag adapted to broadcast a broadcast message, the broadcast message including informational data and a range of relevance, the smart asset tag can include a transceiver, a processor, data storage and an NFC tag, wherein, upon association of a consumable with the piece of personal protective equipment a countdown is initiated or a timer is started. Upon completion of the timer or the countdown, the informational data may include a message regarding the consumable which initiated the timer or the countdown. The message may include notification of a fault, a status of the consumable, a refill of the consumable required, or a maintenance required. The smart asset tag may also include a sensor or a sensor input. The timer or the countdown may be altered by data received from the sensor or the sensor input. The smart asset tag may also include an acknowledgement button.

The present disclosure describes a system, the system according to one disclosed non-limiting embodiment of the present disclosure can include a beacon associated with a worker, the beacon including a transmitter, a processor, and a memory, wherein the beacon transmits data about the worker, a receiving device associated with a location or a piece of equipment wherein access to the location or the piece of equipment is based on the data transmitted about the worker. The data about the worker may include one of a worker identification, a security clearance of the worker, an equipment certification of the worker, and a personal protective equipment associated with the worker.

The present disclosure describes a method, the method according to one disclosed non-limiting embodiment of the present disclosure can include repeatedly comparing a signal strength and a directional alignment of an identification beacon associated with a worker and a signal strength and a directional alignment of each of one or more beacons, each beacon associated with a piece of personal protective equipment, determining, for each beacon associated with a piece of personal protective equipment, if a result of comparing the signal strength and the directional alignment of the identification beacon of the worker and the signal strength and the directional alignment of the beacon associated with the piece of personal protective equipment has been consistent over a period of time, and if the result has been consistent, associating the piece of personal protective equipment with the identification beacon of the worker. A further embodiment of any of the foregoing embodiments of the present disclosure may also include limiting entry of the worker to a location unless the identification beacon of the worker is associated with all needed pieces of personal protective equipment for the location. A further embodiment of any of the foregoing embodiments of the present disclosure may also include limiting access to a piece of equipment unless the identification beacon of the worker is associated with all needed pieces of personal protective equipment for the piece of equipment. A further embodiment of any of the foregoing embodiments of the present disclosure may also include comparing an additional type of data broadcast by the identification beacon of the worker and the same type of additional data broadcast by each of the one or more beacons associated with the piece of personal protective equipment. A further embodiment of any of the foregoing embodiments of the present disclosure may include situations wherein the type of additional data includes one of an acceleration, an acoustic signal, and a light signal.

The present disclosure describes a system, the system according to one disclosed non-limiting embodiment of the present disclosure can include an entrance receiving device adapted to receive a plurality of beacon broadcasts from one or more of a plurality of mobile beacons, each mobile beacon associated with a worker, wherein each mobile beacon broadcasts an identification ID of its associated worker, wherein the entrance receiving device monitors the received beacon broadcasts for the identification ID broadcast by each worker of a plurality of workers entering or exiting a location and creates an on-site record of recorded identification IDs present, a muster site receiving device adapted to receive a plurality of beacon broadcasts from one or more of a plurality of mobile beacons, each mobile beacon associated with a worker, wherein the muster site receiving device records the identification ID associated with each worker of the plurality of workers at a muster site resulting in recorded muster site IDS, and a remote server in communication with the entrance receiving device and the muster site receiving device to distribute the on-site record created by the entrance receiving device, wherein the muster site receiving device compares the recorded muster site IDs with the on-site record and, if there are workers in the on-site record that are not recorded by the muster site receiving device, triggers an alarm. Triggering the alarm may include an audio alert, a visual alert, a haptic alert or a combination of audio, visual and haptic alerts. Triggering the alarm may include sending a signal to the remote server to alert one or more specified individuals. The muster site receiving device may include a cellular communication module. Triggering the alarm may include sending one of a text or a voice message using the cellular communication module.

The present disclosure describes a system, the system according to one disclosed non-limiting embodiment of the present disclosure can include a receiving device, the receiving device can include a receiver adapted to receive a beacon broadcast from one or more of a plurality of beacons and a processor, wherein the receiving device receives the beacon broadcast including informational data and data regarding a range of relevance and determines whether the receiving device is within the range of relevance specified in the beacon broadcast and, if so, the receiving device processes the informational data and initiates an action in response to the informational data. The informational data may include threat information. A further embodiment of any of the foregoing embodiments of the present disclosure may also include a gas detector of the receiving device, wherein, if the threat information includes an airborne toxin, the gas detector automatically begins to test for a presence of the airborne toxin. A further embodiment of any of the foregoing embodiments of the present disclosure may also include a gas detector of the receiving device, wherein, if the threat information includes an airborne toxin, the gas detector automatically runs a self-calibration test for the airborne toxin. In response to the informational data, the receiving device may activate a warning message. When the receiving device also includes a speaker, the warning message may be audible. The receiving device also may include a visual display, the warning message may be visual. When the receiving device also includes an actuator, the warning message may be haptic. The warning message also includes an indication of the need for a piece of personal protective equipment, or the lack of a required piece of personal protective equipment. The informational data also includes a sensor data. The receiving device may provide a calibration instruction to a user based on the sensor data. The action may include transmitting the informational data to another device. The action may include logging the informational data. The informational data may include a required personal protective equipment. If the receiving device fails to detect the required personal protective equipment, it instructs a user to leave an area. The action by the receiving device may be one of the receiving device continuing to be powered on, powering down the receiving device, locking the receiving device, engaging an alarm on the receiving device, or disengaging the alarm on the receiving device.

The present disclosure describes a method, the method according to one disclosed non-limiting embodiment of the present disclosure can include receiving a beacon broadcast message, the beacon broadcast message including informational data and relevant signal strength, determining a strength of the received beacon broadcast message, comparing the strength of the received beacon broadcast message and the relevant signal strength, if the strength of the received beacon broadcast message is greater than the relevant signal strength, processing the informational data, and initiating an action based on the processed informational data. A further embodiment of any of the foregoing embodiments of the present disclosure may also include situations wherein, when the processed informational data includes threat information, emitting a warning. A further embodiment of any of the foregoing embodiments of the present disclosure may include situations wherein the warning may include a visual, an audible or a haptic indication.

The present disclosure describes a device including a beacon adapted to broadcast a beacon broadcast comprising informational data and a range of relevance of the informational data; a receiver adapted to receive a transmission; and a wireless communications module adapted to transmit the transmission to a cloud server. A receiving device may identify the beacon broadcast as relevant if a strength of the beacon broadcast exceeds the range of relevance and processes the beacon broadcast if it is identified as relevant. The transmission may be transmitted by the receiving device to the device, wherein it is in turn transmitted by the device to the cloud server. The transmission may be triggered if the beacon broadcast is identified as relevant. The informational data may relate to identifying a location of the device as a muster site. The transmission may relate to identifying a user of a receiving device that transmitted the transmission.

BRIEF DESCRIPTION OF THE FIGURES

The disclosure and the following detailed description of certain embodiments thereof may be understood by reference to the following figures:

FIG. 3B depicts a SW stack on the receiving device.

FIG. 4 depicts a process for determining whether a beacon is in range.

DETAILED DESCRIPTION

Figure 1A:
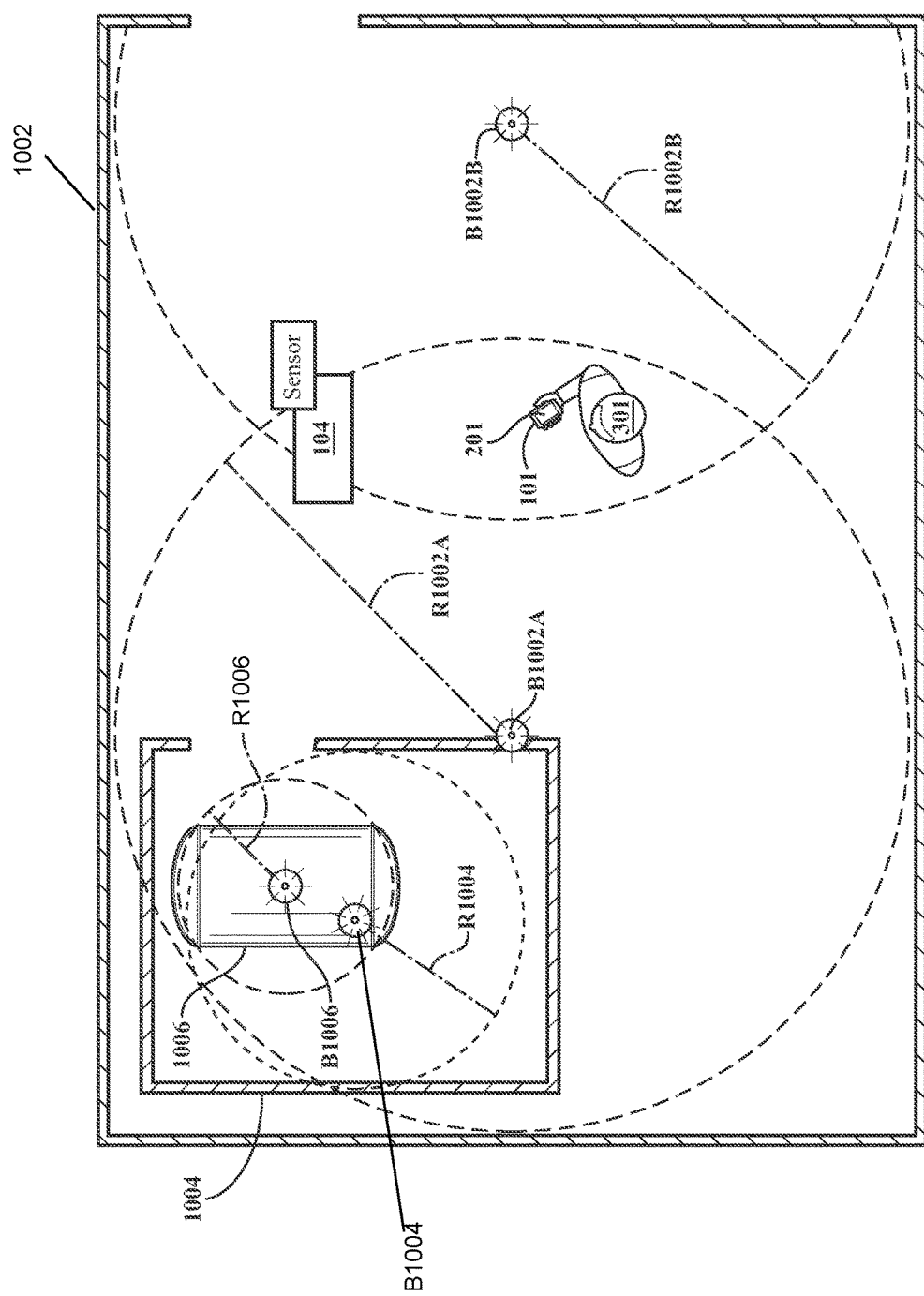
FIGS. 1A and 1B depict an environment of beacons and receiving devices.
Figure 1B:
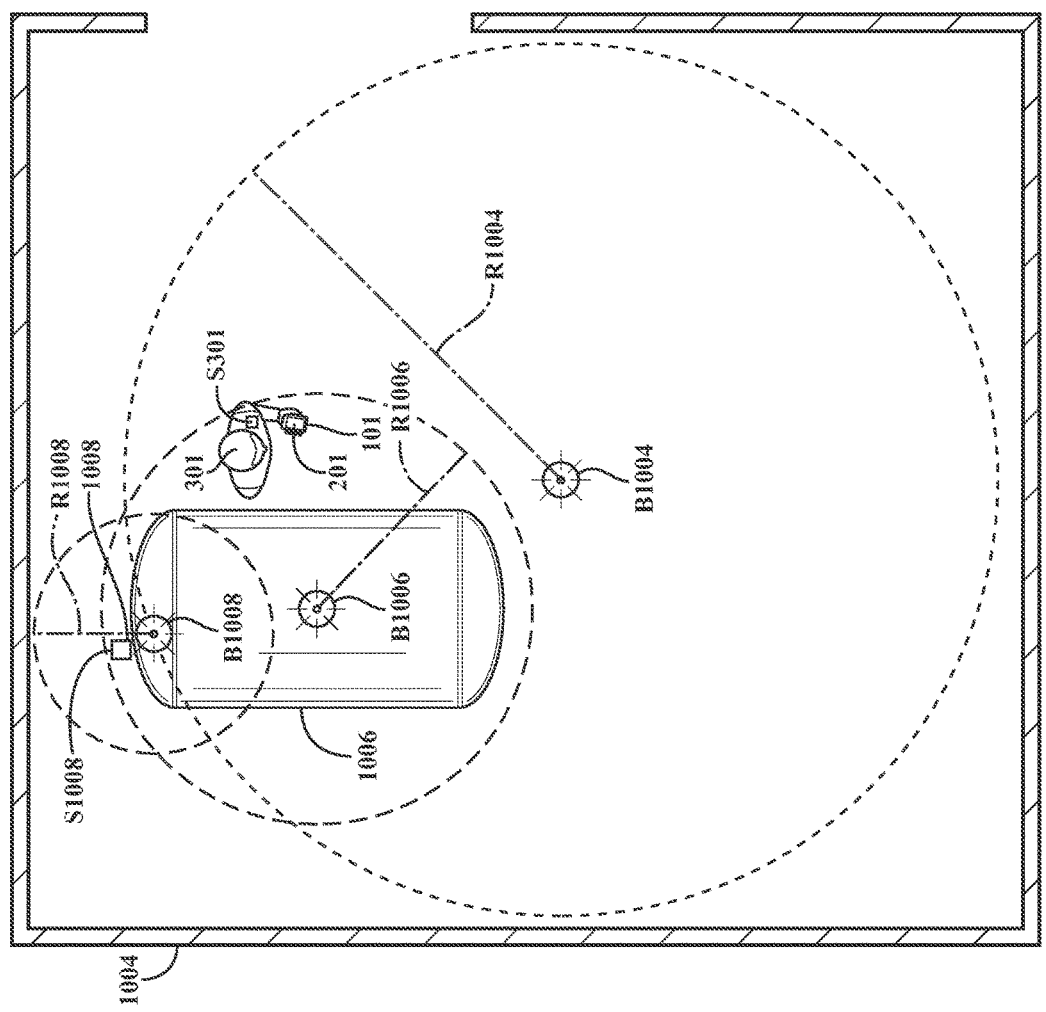

An information and location communication system of beacons may be deployed in industrial settings having large, open interior spaces, such as a factory building 1002, as shown in the non-limiting example of FIGS. 1A-1B. The area over which each beacon provides information of relevance, e.g. the beacon's range or scope of relevance, may be selected, allowing for a plurality of beacons of varying ranges of relevance to provide coverage of a space using a non-uniform, sparse deployment scheme.

A beacon may repeatedly transmit an informational message or data, the beacon's payload, followed by information about the range in which the informational message is relevant, e.g. the range of relevance. This informational message (payload, range) may then be repeated either continuously or when triggered based on input to the beacon provided from a separate device, such as a sensor. In embodiments, this system does not rely on an application in the cloud to determine the relevance of a sensed message. Rather, the beacon transmits details regarding the range over which the accompanying informational message or data is relevant. In embodiments, the details may be related to a minimum received signal strength at which a received signal is relevant such as received signal strength indicator (RSSI), received channel power indicator (RCPI), and the like. For example, a beacon may transmit a minimum signal strength as an RSSI value at which the accompanying informational message is relevant to a receiving device. If the RSSI of the received signal is lower than the specified minimum, the accompanying informational message is not relevant and the receiving device may ignore the message. Although the methods described herein refer to a beacon that transmits a specified minimum RSSI, below which an accompanying message may be ignored, other embodiments are contemplated. In another embodiment, the transmission power for each beacon may be adjusted during installation such that the beacon signal will exceed a commonly specified minimum only within the area of relevance.

In an illustrative example, a receiving device may detect a signal with an RSSI of 80 where the received signal specifies a minimum signal strength of 100 RSSI. Because the RSSI of the incoming signal is below the specified minimum signal strength, the receiving device should ignore the corresponding informational message. If the receiving device detects an incoming signal at an RSSI of 110 and the signal specifies a minimum RSSI of 100, the corresponding informational message is relevant and the receiving device should process the message. In a non-limiting example, the beacon 1002B may repeatedly transmit a minimum signal strength of 50 RSSI followed by "Factory Building 30." The beacon may transmit with sufficient power such that the signal may be received anywhere within the factory building 1002 at an RSSI greater than 50.

A plurality of short to mid-range beacons may be deployed around locations or features of interest while longer range beacons may be sparsely deployed to provide general coverage of a large open area, such as beacons B1002A and B1002B, which may be located and programed to provide coverage of a large area such as the factory building 1002. The beacons B1002A and B1002B may be designed to have a range R1002A and R1002B corresponding to the interior space of the factory building 1002. In some embodiments, a plurality of beacons B1002A and B1002B transmitting the same information may be deployed to provide adequate coverage of a large open area. The beacons may be omnidirectional or unidirectional such that coverage corresponds to the relevant area.

Industrial spaces may include smaller, more restrictive spaces within larger spaces, such as a tank room 1004 located within the factory building 1002. A corresponding beacon B1004 may be located in the small tank room with a range R1004 corresponding to that of the more restrictive space of the tank room 1004 of this example. The range of the beacons may be constrained further to provide a finer level of detail. For example, there may be a third beacon B1006 having a smaller range R1006 positioned by a specific object such as a tank 1006 located in the tank room 1004. As shown in the expanded detail of FIG. 1B, the may be a fourth beacon B1008 having a range of R1008 positioned by a feature of the object such as the tank valve 1008. There may be sensors located throughout the industrial setting that may relay information to various beacons, such as the sensor S1008 located near the tank valve 1008.

This solution of a sparse beaconing system may enable rapid setup in short term situations such as construction sites, drilling sites, mining sites and the like. There may be large numbers of workers and equipment at a location for a short period of time. However, during this short period, monitoring of workers and equipment may be important. A solution requiring the installation of a dense number of access points or extensive site mapping may involve higher costs and longer installation times to meet the short term need.

A user 301 may move through the factory building 1002 transporting one or more of a variety of devices such as an identification tag, a mobile device 101 running a beacon application 201, one or more pieces of personal protective equipment or safety device such as hearing protection, a gas mask, a respirator, a harness, a lighting device, a fall arrest device, and the like, or one or more tools 401, such as a saw, a gas sensor, portable environmental sensing devices, gas detection instruments, a thermal detector, a flame detector, a chemical, biological, radiological, nuclear, and explosives (CBRNE) detector, chemical detection instruments, or any kind of industrial monitoring equipment that logs data about its operation, sensor parameters, users, and the like. All of these devices may be in electronic communication with one or more of the beacon and the receiving device. There may be one or more sensors S301 associated with a user 301 such as on a wearable device or an identification device. There may be sensors S401 associated with the tools 401, such as an NFC identification tag, proximity sensors, accelerometers, biological or wearable sensors such as eye tracking sensors, heart rate sensors, blood pressure sensors, gait detection sensors, olfactory sensors, and galvanic skin response sensors, cameras/image sensor, microphones, infrared sensors, gas sensor, capacitive sensor, fingerprint sensor, signal detectors (e.g. Wi-Fi, Bluetooth, mobile phone, etc.), location detectors (e.g. GPS sensor), and the like. The sensors may be communication with one or more beacons and one or more receiving devices.

Because of the sparse distribution and varying range of the location beacons, installation may be more efficient than that of an access point or RSSI triangulation system. Initially those beacons associated with the largest areas, lowest precision are installed and calibrated to be "in range" over the space of interest. The installation of these beacons may be followed by the installation of progressively smaller range, higher precision beacons. As the identification of areas needing higher precision location information occurs, such as the installation of new equipment, it may be straight forward to add new beacons into the existing system without the need to update the existing beacons. It is not necessary that the sequence above be followed. An aspect of this embodiment is that areas requiring less resolution, for example a building, may be provided with a beacon having a larger range than areas requiring more resolution, i.e., specificity, such as a tank room inside a building.

Figure 2:
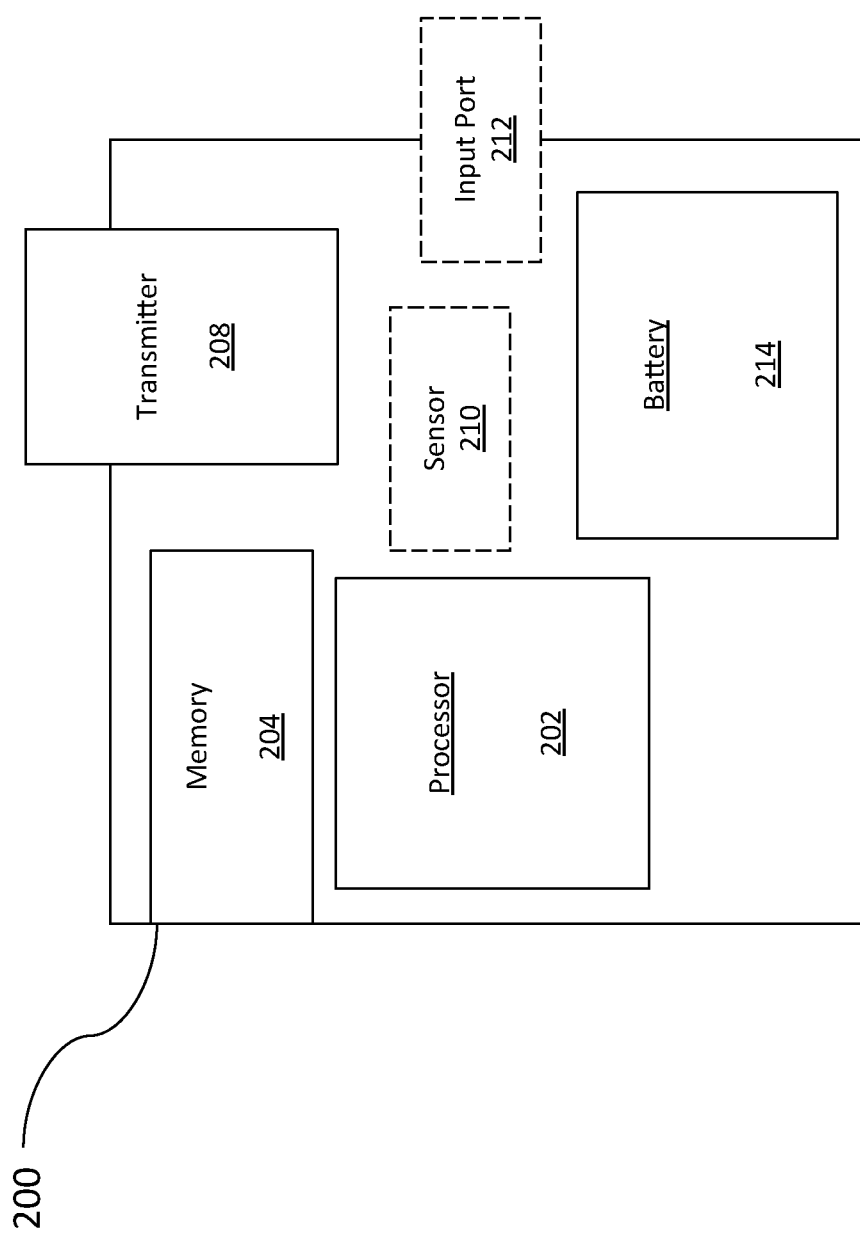
FIG. 2 depicts a beacon.

Referring to FIG. 2, a beacon 200 may include a processor 202, memory 204, and a transmitter 208. In some instances the beacon 200 may include a sensor 210 or an input port 212 for receiving input from a sensor. The beacon 200 may be battery 214 operated. The beacon 200 may broadcast information at a regularly scheduled interval using standard wireless protocols, such as BLE. The frequency at which the information is broadcast as well as the format of the broadcast may be based on standard beacon formats, such as iBeacon, Eddystone, AltBeacon and the like, or a custom format. The beacon 200 may include a near field communication (NFC) interface to facilitate secure communication for updates to the beacon and the like.

The beacon 200 may be battery 214 operated with a battery life of approximately 4 years. The beacon may be operable over a wide temperature range such as −40° to +50° Celsius with a protective enclosure providing Ingress Protection (IP) of 65/66 (impervious to dust and water jets) and so suitable for both indoor and outdoor use. The beacon 200 may also be certified for use in environmentally hazardous areas such as those comprising combustible gases and/or dust, and the like. The beacon, or at least an enclosure of the beacon, may be intrinsically safe and/or explosion proof.

A beacon may be located in a fixed location, for example associated with an enclosed area in a facility. A beacon may be associated with a mobile asset such as a piece of equipment, a user, a batch of material and the like. A beacon may be associated with a receiving device, either in the same location or integrated in the same device. In some embodiments, a beacon may transmit more than one informational message (payload, range) sequentially and repeating continuously. The ranges associated with each payload need not be the same. For example, a beacon may transmit ("Tank Room 3", 20 RSSI) ("Potential H2S Hazard, 15 RSSI). A beacon may receive input from environmental sensors, tools, user sensors, equipment and equipment status sensors and the like as described elsewhere herein, and transmit the received input.

Figure 3A:
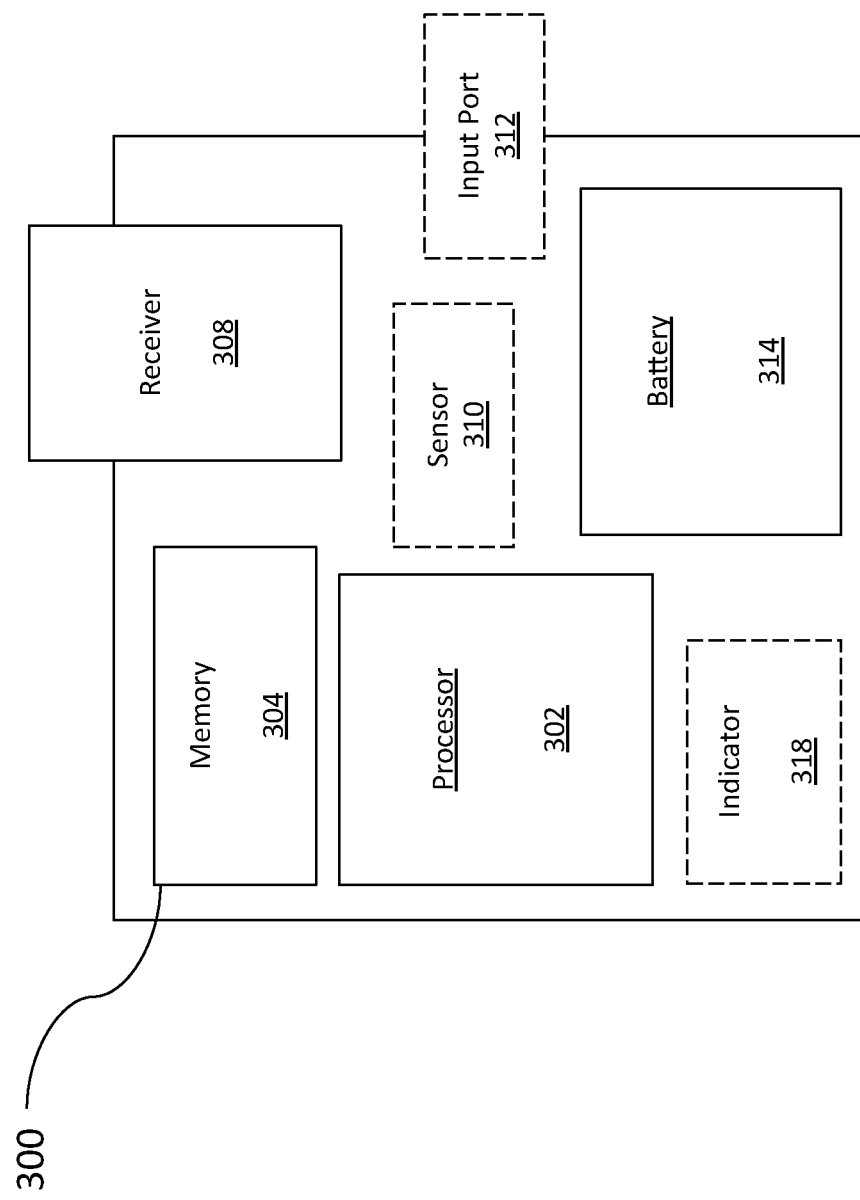
FIG. 3A depicts a receiving device.

Referring to FIG. 3A, a receiving device 300 may include a processor 302, memory 304, and a receiver 308. In some instances the receiving device 300 may include a sensor 310 or an input port 312 for receiving input from a sensor or sensor device either directly or indirectly via another form of electronic communication. In some instances the receiving device may have an indicator 318 such as a light or display, a speaker for audio alerts, and a vibrating mechanism for haptic alerts. The receiving device 300 may be battery 314 operated. The components of the receiving device may be implemented on a hardware chip or tag to provide low cost receiving devices.

Referring to FIG. 3B, the software stack running on the receiving device 300 may include an API for controlling the receiver hardware 352 coupled with a standard beaconing framework 354. The API for controlling the receiver hardware may be designed to support Bluetooth Low Energy (BLE), ANT, or other low powered communication protocols. Together the API for controlling the receiver hardware 352 and the standard beaconing framework 354 handle the details of the physical communications between the beacon 200 and the receiving device 300 and how to handle beacons at the operating system level such as by causing an interrupt to be generated in a mobile device when it is in sleep mode. The smart beacon application 358 interprets the data received from the beacon.

The smart beacon application 358 may keep a list of active beacons that can be heard. If an active beacon is not heard over a number of scans, it may be removed from the list of active beacons. In embodiments, the number may be a predetermined number of scans. In embodiments, the number may be a predetermined number of consecutive scans. For each beacon, a normalized beacon strength may be calculated relative to the transmitted range for that beacon. The difference between the received strength of the beacon signal and the transmitted range (minimum received strength) may be normalized relative to the transmitted range.

$$\text{Normalized Beacon Strength} = \frac{\text{Received Strength} - \text{Minimum Strength}}{\text{Minimum Strength}}$$

The smart beacon application 358 may determine an average beacon strength over a specified number of samples. The smart beacon application 358 may identify a best beacon for location beacons while listening to all relevant beacons for categories such as hazards, alerts and the like. The best site beacon for a location may be identified as the beacon with the highest average beacon strength. However, the newly identified best site bacon may be required to exceed the average beacon strength of the current site beacon by a predetermined margin to avoid constant flipping of sites at the margins.

The receiving device 300 may be a mobile device 101 (FIG. 1A) such as a laptop computer, a smart phone, a tablet and the like running an application 201 designed to interpret and act on a signal received from a beacon. The receiving device 300 may be a smart identification badge worn by a user, or personal protective gear worn by a user such as a respirator mask, eye protection, hearing protection, protective footwear, hardhat, exposure trackers, personal protective equipment or safety devices as described herein, and the like. The receiving device may be a tool such as a saw, electronic measurement equipment, portable environmental sensing devices, gas detection instruments such as multi-gas, single gas, and combustible gas detectors, a thermal detector, a flame detector, a chemical, biological, radiological, nuclear, and explosives (CBRNE) detector, chemical detection instruments and the like. The receiving device may be attached to a batch of material such as chlorine, bleach, ammonia, and the like. In addition to receiving signals from beacons, a receiving device may be in electronic communication with sensors, equipment, a smart identification badge, a remote server, and the like.

A beacon may transmit absolute location in terms of latitude and longitude or the beacon may transmit a location name such as "Factory Building 30", "Tank Room 3", "Tank 1", "Valve 37" and the like. Beacon information (e.g. the informational message or the informational data) may include information typically seen on signage specifying personal protection or safety gear required in an area or security clearances required in an area. Beacon information may include fault conditions and alarms based on sensor inputs such as "Leak on Valve 37." Beacon information may include instructions to be followed within the beacon's sphere of influence such as "No cell phones", "No Ammonia" and the like. Beacon information may include equipment available at the location, gas detection instrument dock nearby, a fuel source at the location, a known hazard at the location, a typical gas concentration for the location, an environmental condition for the location, a recent gas event, a recent man down alarm, a recent alarm, and the like.

In some embodiments, the beacon may be used to broadcast informational data regarding security clearance needed in the range of the beacon. A beacon located near a location may broadcast that a particular security clearance level is needed. If the user's security level is not at the broadcasted minimum required security clearance or higher, the instrument may emit a warning message audibly, visually, haptically, or combinations thereof.

For example, a worker may attempt to enter a location by touching her instrument or device to an NFC location tag at the location. The beacon for that location may be transmitting a hazard alert signal, so once the instrument is associated with the location and receives a hazard alert signal from the beacon with the same location information as the location tag, the instrument or device may be caused output a signal to stay out of the location.

In another example, the beacon may broadcast informational data comprising an authorization level that has changed. The worker may assign the instrument or device to themselves with an NFC tag that has information about their authorization level. The worker may reach a location with a beacon and the worker's instrument or device will obtain the broadcasted information from the beacon regarding the changed authorization level. If the authorization level being broadcasted matches the information from the NFC assigned information, a message is sent back to the server requesting access. Access may be granted remotely, an access passcode may be sent back to the worker, and the like.

In some embodiments, real-time information signage including integrated beacons may be used in conjunction with data collected from instruments. For example, a real-time sign may be in electronic communication with one or more instruments, devices, a server or a third party device such as by WiFi, Bluetooth, RFID or the like. The real-time sign may be located in an area and may display data based on an alarm from a nearby instrument and may serve as a remote alarm. The data may be transmitted directly to the sign using a wireless network or may be transmitted to the cloud where it is processed to determine if it should be displayed on the real-time information sign. In embodiments, a plurality of instruments, which may be enabled to communicate in the wireless network or may be NFC-enabled, may transmit data (e.g., sensed data, assignment data, location data, calibration status, etc.) to the server, at least partially by the wireless network, wherein the data may be displayed by the real-time sign. In embodiments, the real-time information sign broadcasts additional information, using its integrated beacon, such as more detailed instructions, the effective radius of the displayed message, and the like.

Beacons may be used to inventory items in an area in order to provide for alarms. For example, secondary alarms may be generated from an eyewash/shower pull, wherein the pull itself may generate a primary alarm. An inventory of items in the area may be needed in order to generate the secondary alarms, wherein the inventory is known at the remote location so that it gets displayed to first and second responders upon the eyewash/shower pull or the inventory is gathered by a nearby instrument in communication with a beacon in the area and transmitted remotely. The inventory may include information such as: strong acid present, tank of phosphine present, gases present, chemicals present, combination of gases and chemicals present, or any information that would be on a posted hazard placard.

Referring back to FIG. 1A, it may be seen that the use of the beacons allows for location determination at varying degrees of specificity. For example, locations on the right side of the building (away from the tank room) may be determined using two beacons B1002A and B1002B. The receiving device simply determines that it is in the location specified by the beacons. However, using the same system, the lower range, but higher specificity, beacons may be used to enable a receiving device located in the tank room to determine whether it is in the tank room based on beacon B1004 or whether it is near a tank using beacon B1006.

As shown in FIG. 4, when a receiving device receives a transmission (step 402) it determines the strength of the received signal (step 404). It then parses the beacon signal for range information/minimum signal strength (step 408). After obtaining the minimum signal strength the receiving device compares the received signal strength with the minimum signal strength (step 410). If the received signal strength is less than the minimum signal strength, the transmission is ignored (step 412). If the received signal strength is equal to or greater than the minimum signal strength, the accompanying data is processed (step 414).

Figure 5:
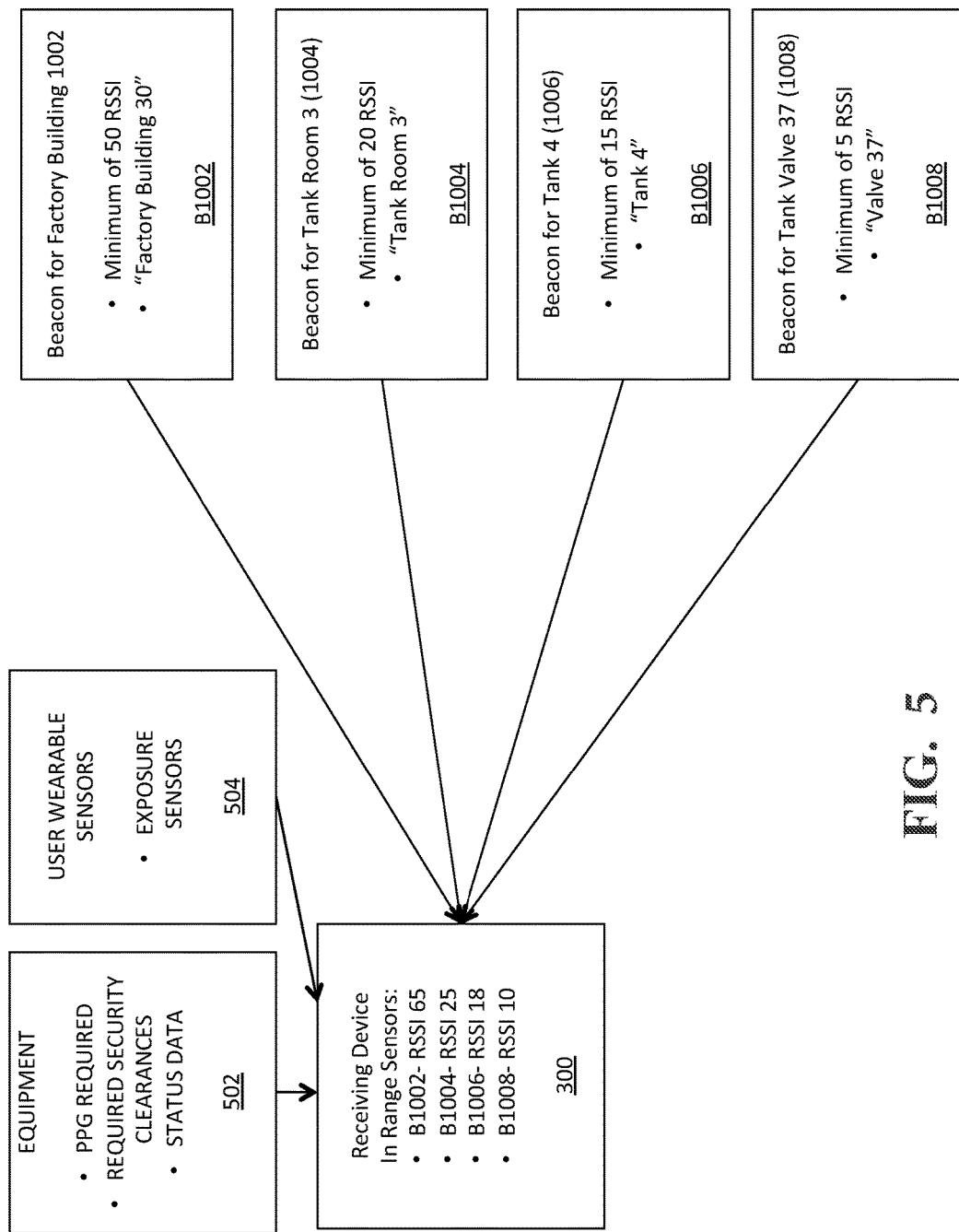
FIG. 5 depicts an example of a receiving device in range of multiple beacons.

As shown in FIG. 5, a receiving device 300 may be within "range" of more than one beacon. A receiving device 300 may be positioned where it will receive signals from more than one beacon and more than one of the signals may be received at a strength greater than the specified minimum. Additionally, a receiving device 300 may also receive information from other items in the environment, such as environmental sensors, wearable sensors 504, user equipment 502 and the like as described elsewhere herein. In the example of FIG. 5, receiving device 300 has received 4 signals, all of which were received at a strength above the minimum specified for that beacon. The receiving device 300 may then identify which information has higher value/greater priority. For location information, priority may be based upon which beacon has a smaller area of influence and therefore more specificity. For example, as shown in FIG. 5, a receiving device 300 positioned within the tank room 1004 may receive a signal from beacon B1002 indicating that the receiving device 300 is in "Factory Building 30," beacon B1004 indicating that the receiving device 300 is in "Tank Room 3," beacon B1006 indicating that the receiving device is near "Tank 4," and beacon B1008 indicating that the receiving device is near "Valve 37." All the beacon signals may be received at strengths above each respective beacon's specified minimum strength meaning that all are relevant to the receiving device. However, the beacon with the smallest range, B1008 (having a minimum signal strength of 5 RSSI), has priority in location identification over that of the beacons having larger ranges, B1002 (minimum signal strength of 50 RSSI), B1004 (minimum signal strength of 20 RSSI), and B1006 (minimum signal strength of 15 RSSI) because the smallest range provides greater specificity. The receiving device 300 knows not just that it is in "Factory Building 30" or in "Tank Room 3" near "Tank 4" but that it is near "Valve 37." Additionally, the receiving device 300 may receive data from other beacons associated with the wearable sensors 504, user equipment 502, environmental sensors and the like.

This system may enable a number of applications. In addition to receiving information from beacons that are deemed to be in range, receiving devices may also receive information from other items in the environment, such as wearable sensors, environmental sensors, beacons, user equipment and the like as described elsewhere herein. The receiving device may than cause the certain relevant data to be displayed or certain actions to occur such as shutting off a piece of equipment.

In some embodiments beacons may be used to broadcast information regarding security clearance needed in the range of the beacon. Users may receive his or her own NFC assignment tag identifying them which can be attached to a name badge, employee ID, or other personal item. Then, each day, the employee may pick up an instrument from a shared pool or tool crib at the start of his or her shift. When the instrument is touched to the assignment tag, the assignment of the device to the user is complete. The device may be further configured to the user's needs and/or specification, and may also include data about the user, such as name, a size, a weight, a typical work location, a job function, a typical instrument used, a pre-existing concern, a language known, any machine certifications, a prior alarm, a prior gas or safety event, any prior radiation exposure levels, a prior message and a security clearance. A beacon located near Tank 1 may broadcast that a particular security clearance level is needed. If the user's security level is not at the broadcasted minimum required security clearance or higher, the instrument may emit a warning message audibly, visually, haptically, or combinations thereof.

In some embodiments, beacons may be used to broadcast information regarding potential hazards, for example the possible presence of hydrogen sulfide ($H_2S$). The receiving device may have already identified the presence or absence of various protective gear or monitors as described elsewhere herein. If the receiving device is in range of a beacon warning of a potential hazard for which the user is not prepared, for example the potential presence of $H_2S$, the receiving device may take a variety of actions depending upon the equipment available. If the user has a gas detector that is capable of detecting $H_2S$ but sensing was not enabled, the receiving device may cause the $H_2S$ sensing to be activated. If the user does not have a gas detector, the receiving device may emit a warning message audibly, visually, haptically, or combinations thereof to the user. If a receiving device is located near an entrance to the location having the potential hazard, a beacon associated with the receiving device may broadcast a command to lock the door.

In some embodiments, beacons may be used to broadcast information regarding required safety devices, such as hearing protection required. The receiving device may alert the user to put on hearing protection or, if the receiving device does not detect the presence of hearing protection, the user may be instructed to leave the area. In some embodiments the beacon may not broadcast continuously but only in response to sensor input (either internal or external), in this example if an input from a noise sensor exceeds a certain threshold. In some cases the beacon may broadcast the sensed parameter such as a temperature, noise level, gas level and the like.

In some embodiments, beacons may be used to broadcast real time conditions or real time hazard information. A beacon may be connected to one or more sensors and broadcast the sensed parameter in real time. Examples of such sensed parameters may include temperature, humidity, atmospheric pressure, altitude, concentrations of specific gases in the atmosphere, airflow, noxious odors, and the like. In response to such information, a receiving device may issue an alert, transmit the sensed parameters to a second receiving device, adjust a calibration or calculation, log the information, and like. The sensor may be attached to a piece of equipment and provide status information such as operational status (e.g. laser on), fault alerts, time until maintenance is due, recent users, recent safety or gas events, environmental information such as temperature, barometric pressure and the like. For example, a beacon may transmit repeatedly that the laser is on repeatedly while the laser is on. Upon receipt of a message that the laser is on, a receiving device may alert a user not to enter the area, or to don protective eyewear before entering the area. In another example, a beacon may transmit repeatedly that the air conditioning is not working. Upon receipt of that message, the receiving device may alert a user to not enter the area.

A beacon may be used to transmit emergency response information such as the muster location where every user should assemble in case the facility is evacuated. The beacon may transmit the location of emergency equipment such as a first aid kit, a portable defibrillator, fire extinguisher, and the like.

A beacon may be used to disable automated responses in select areas. Some facilities may have a "man down" transponder or beacon that transmits a distress signal when a user has been stationary for an extended period of time. However, the user may also be stationary in the cafeteria. Currently, some users will manually disable their "man down" alarm to avoid it being activated during a meal. However, they may forget to turn it on. A beacon located in the cafeteria could transmit a command to temporarily disengage the "man down" alarm. The receiving device could response by disengaging the "man down alarm" while within range of that beacon. When the user moves out of range of that particular beacon, the receiving device would revert to a default of having the "man down" alert active.

In some embodiments, beacons may be used to broadcast general information to a user, similar to a sign posted in an area. The information broadcast may be rules regarding the area such as safety glasses required, hearing protection required, do not enter signage, contact information for requesting entry, and the like. The information transmitted by a beacon may be dynamic in response to changing sensor input. Additionally, a beacon may be programmable such that the information transmitted by the beacon in response to a sensor input may be changed. In embodiments, a beacon may be updated from a mobile device, such as a smart phone, using short range communication such as near field communication (NFC), Bluetooth Low Energy (BLE), and the like. For example, a beacon may be updated by touching a smart phone having NFC capability to the beacon to transmit updates to the beacon. For example, this feature may be used by Industrial Hygiene to promulgate new rules such as lowering a noise level at which hearing protection is required. Initially a beacon may have been programmed to broadcast "Hearing Protection Required" when a noise sensor registers 180 dB or more. The beacon may be updated to broadcast "Hearing Protection Required" when a noise sensor registers 150 dB or more.

In some embodiments, beacons may be used to broadcast instructions related to a piece of equipment, work required in an area and the like. For example, a beacon associated with a mining machine may broadcast a series of steps or items to be executed prior to starting the mining machine. For example, the beacon may broadcast the following instructions in a small range around the machine controls: "verify brake engaged before starting", "make sure blades are disengaged before starting", and the like.

In another example, a beacon may broadcast work targets for a particular shift in response to external input. A beacon may broadcast the work targets over a range associated with the manufacturing location for which the targets apply, such as an assembly line where the work would be done. A separate beacon might broadcast different targets for a different work area where the range would correspond to a neighboring assembly line.

In some embodiments, a beacon associated with a piece of equipment may be used to broadcast normal process parameters for that piece of equipment. A receiving device may display a message to a user working with the machine to the effect that "normal parameter readings are 'A' RPMs, 'B' temperature, and the like." The user may then reference the information received from the beacon to determine whether the process is in control, whether adjustments need to be made, etc.

In some embodiments, a beacon may be used to broadcast calibration instructions to equipment. For example, in a location at a known altitude of 1000 meters, there may be a beacon that broadcasts "Adjust Barometer for 1000 meters." An "in range" receiving device associated with a piece of equipment having a barometer would then recalibrate the barometer to 1000 meters, thus potentially removing error associated with changes in barometric pressure. In another example, a beacon associated with a temperature sensor may broadcast instructions such as "Recalibrate your gas sensors for sensed temperature." An 'in range' receiving device associated with a gas meter may then adjust its calibration to account for the potentially changed volatility of the gases at the sensed temperature.

A beacon may broadcast information regarding potentially adverse interactions. In some embodiments, the beacon may broadcast the presence of a chemical or condition that has the potential for adverse interactions such as "Chlorine Present," "Ammonia Present" and the like. A receiving device, upon hearing such a broadcast, would need to determine whether the presence of the broadcast chemical or condition would impact their user or equipment. For example, if the user had a piece of equipment that might be damaged by chlorine, the receiving device might display a warning message or alarm. In an alternate embodiment, a beacon might warn away certain chemicals, types of equipment and the like because of the potential for an adverse interaction with something in the area covered by the beacon. For example, if chlorine was present in the area covered by the beacon, the beacon might broadcast "No Ammonia Allowed." In another example, if an area contained certain volatile gases, a beacon might broadcast "No Sparks."

The beacon may broadcast information about the availability of other devices, services, conditions, items, people, or the like in the area. For example, the beacon may be used to broadcast the availability/status of a nearby automatic external defibrillator (AED), the availability/status of an eyewash station, the availability/status of an emergency lab shower, the availability/status of a fire extinguisher, the availability/status of a chemical shower, the availability/status of a sorbent, and the like, wherein the a user instrument may display the broadcasted information. In embodiments, the data broadcast by the beacon may be stored by the instrument. In embodiments, the beacon broadcast includes informational data regarding an availability or a status of a safety item and a range of relevance of the informational data. The informational data may include any information, such as information regarding status of items, instructions for items, location of items, directions to an item, a graphical indicia or a map showing the location of items and/or directions to the item, and the like. The beacon broadcast is identified as relevant if a strength of the beacon broadcast exceeds the range of relevance, and once identified, is presented on a user device. An alert on the safety item may be triggered when the user selects the safety item on the user device.

In some embodiments, a beacon may be mobile and associated with a user. The beacon may broadcast "I am John Smith" or other pertinent personal information in a small area surrounding the user. The mobile beacon may broadcast user information comprising one of user name, user identification, user authorization or user safety equipment. This would allow for equipment to log each user that engaged with the equipment. In another example, upon evacuation of a facility, there may be a receiving device at the muster point (described elsewhere herein) that could obtain a head count as people exited the building, thus helping ensure the safety of the employees and any rescue workers. In embodiments, the receiving device may control access to a space or equipment and may block or allow access depending on the information received from the beacon. For example, if the personal information received from the beacon matches information on an access list, access may be granted.

Figure 6:
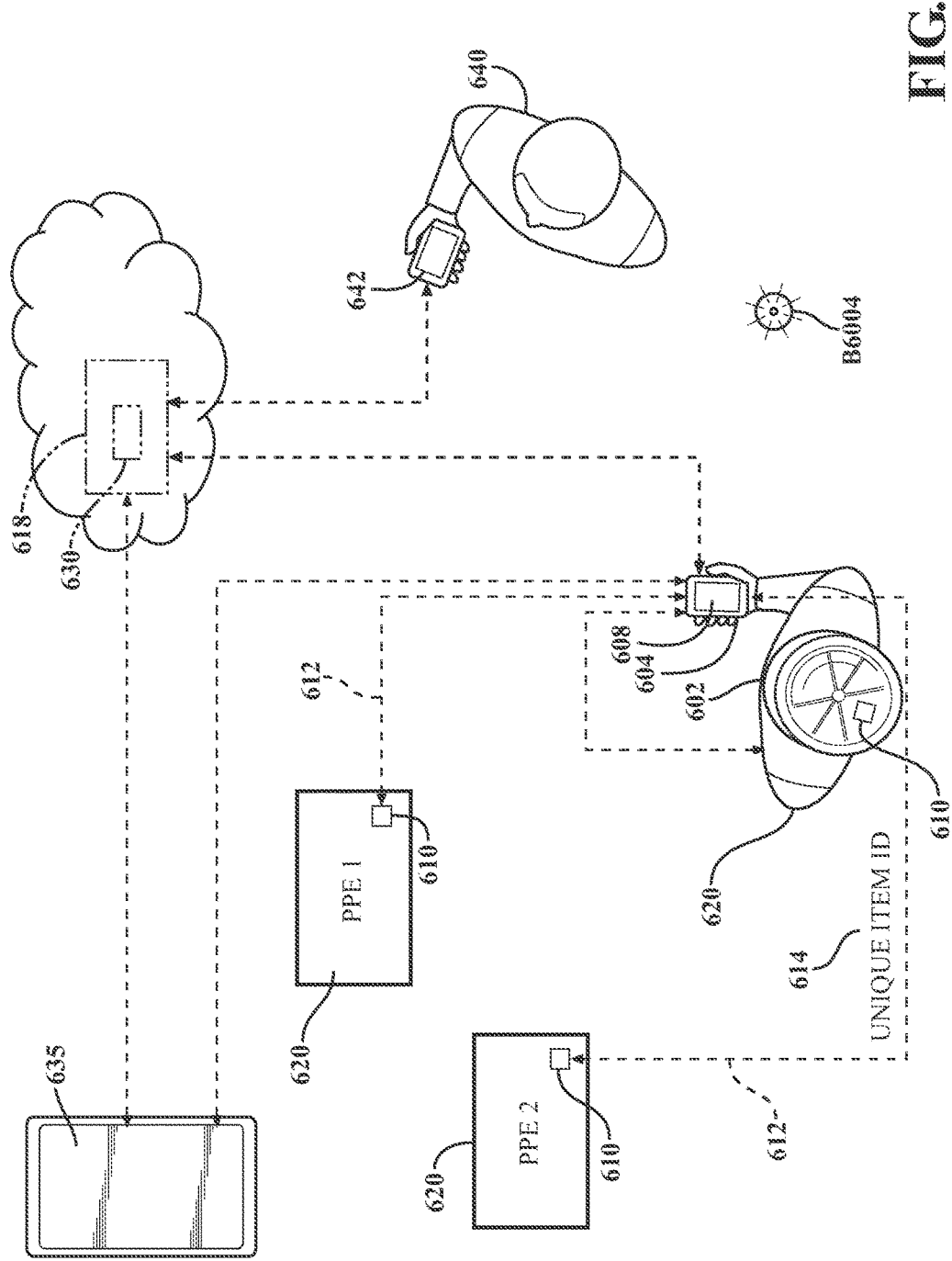
FIG. 6 depicts an example of an asset management system.
Figure 7A:
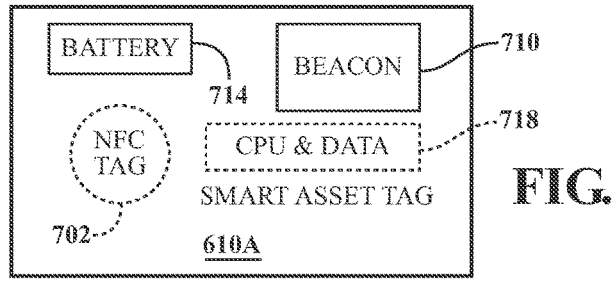
FIGS. 7A-7D depict examples of smart asset tags.
Figure 7B:
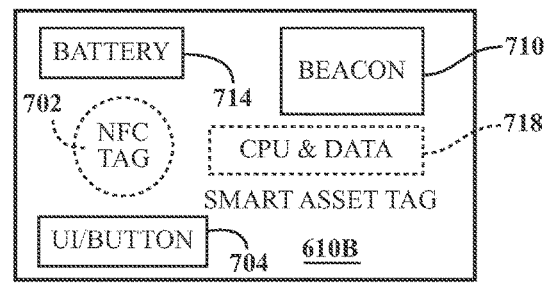
Figure 7C:
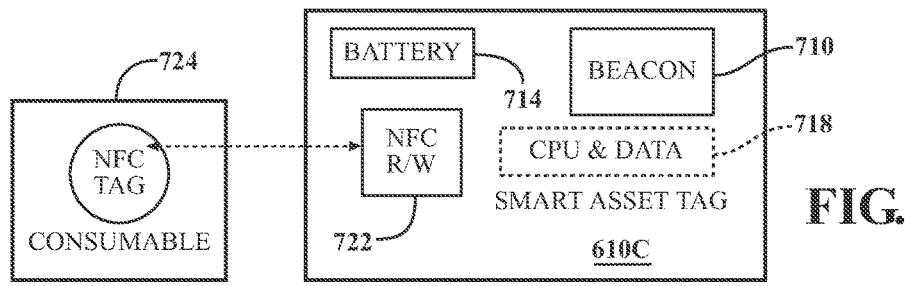
Figure 7D:
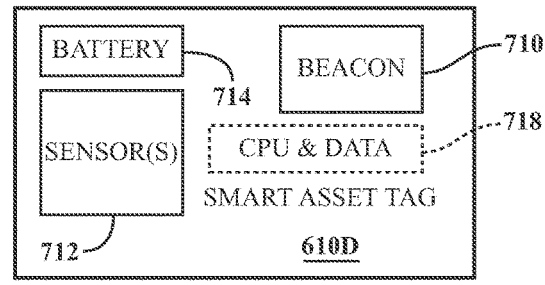

In some embodiments, a beacon may be mobile. A transceiver may be incorporated in a smart asset tag which may be associated with an asset such as a piece of personal protective equipment (PPE) (e.g. a helmet, a respirator, steel toed boots and the like), personal items such as prescription safety glasses, laptop computers, toolboxes and the like. The transceiver of the smart asset tag may broadcast a unique item identifier, either continuously or at periodic intervals. In addition to, or instead of, a unique item identifier, the transceiver of the smart asset tag may broadcast range in which the beacon of the smart asset tag is relevant as described elsewhere herein and information about the asset such as the type of asset (e.g. "I am a helmet"), the status of the asset (e.g. "need servicing"), date of last calibration, collected data, operational status (e.g. laser on), fault alerts, time until maintenance is due, recent users, recent safety or gas events, environmental information such as temperature, barometric pressure, and the like. In an asset management scenario (FIG. 6) a plurality of personal protective equipment (PPE) assets 620 may each be labeled with a smart asset tag 610 having a unique item identifier. An asset management system 630 on a cloud server 618 may have a database with information associating each unique item identifier with the data regarding the asset with which it is associated such as type of item, purchase date, date maintenance due, any damage, any alarms, calibration records, data log, most recent location, individual using the asset, and the like. This information may be updated by a user accessing the cloud server 618, or, in those cases where data is provided by the asset, such as data logs, asset status and the like, is added, the data may be downloaded by a data foraging device, downloaded using a docking station, near field communication (NFC) data exchange, and the like.

In an embodiment, multiple individuals, while going about their normal duties, may act as data foragers 602 to opportunistically conduct an asset survey, as will be described herein. A vehicle or piece of equipment that moves throughout a facility may also act as a data forager 602. The multiple data foragers opportunistically conducting an asset survey as they go about their daily duties may serve to crowd source the status of personal protective equipment located throughout the facility. A data forager 602 may wear or carry a data foraging device 604 capable of receiving signals from the transceiver of the smart asset tag, either actively or in the background, and running a data foraging application 608. The data foraging device 604 may be a smart phone capable of uploading information received from smart asset tags 610 to one or more cloud servers 618 running an asset management system 630. This would allow the data forager to opportunistically gather data on assets in the facility without the need for extensive infrastructure upgrades or individual smart asset tags having dedicated cloud connectivity. The data foraging device 604 may be a wearable smart device or a device on a piece of equipment or vehicle, or incorporated into a piece of equipment or vehicle. The data foraging device 604 may be capable of receiving wireless signals and forwarding the received data and/or receipt information to the cloud via Wi-Fi or cell phone connectivity (LTE etc.) or storing the received data and receipt information when intermittent or no network connection to the cloud is present. Data and/or receipt information from these data foraging devices 604 may be uploaded whenever the data foraging device 604 has network connectivity or when it comes in communication range of a data foraging device 604 that does have network connectivity. Additionally, data and/or receipt information from these data foraging devices 604 may be retrieved when the data foraging device 604 is in proximity to an upload location 635. The upload location may be a wireless access point capable of retrieving the stored data and/or receipt information. The upload location 635 may then upload the transferred data and/or receipt information to the asset management system 630. Upload locations 635 may be located throughout a facility or at one or more select areas that may be expected to be frequented by individuals acting as data foragers 602 such as cafeterias, entrances, exits, break rooms and the like. For equipment and vehicles acting as data foragers 602, a docking station where they are stored at the end of the day may act as an additional upload location 635.

The data foraging device 604 may receive a signal from a smart asset tag 610. If a data foraging device 604, such as a mobile phone, receives a smart asset tag's signal 612, the data foraging application 608 may send the smart asset tag's unique item identifier 614 and other received data to a remote server, such as a cloud server 618. In addition to sending data received from the smart asset tag 610, additional detected information such as a current location of the asset or other receipt information may also be sent. The current location of the asset may be based on the location of the data foraging device (e.g. smart phone location based on GPS, dead reckoning, and the like), data from a location beacon B6004 as described elsewhere herein, and the like. As a data forager 602 moves throughout a facility in the normal pursuit of their duties, the data foraging device 604 may scan for and detect the presence of a plurality of smart asset tags 610 and transmit data from the plurality of smart asset tags 610, locational information regarding the data foraging device 604 and the like to the cloud server 618. The locational data may be obtained from one or more beacons transmitting locational information as described elsewhere herein. In this way, a survey of assets in a location may be achieved opportunistically using a worker's (or vehicle or piece of equipment's) regular movements and proximity to assets without the necessity of installing a dense system of infrastructure and the time and expense involved in an explicit asset survey.

In some embodiments, it may be desirable for a smart asset tag 610 to receive confirmation that data that has been broadcast by the smart asset tag has been received by a cloud server. For example, the smart asset may need confirmation that broadcast data related to a fall, a gas event, error conditions and the like has been received by a cloud server and incorporated into an asset management system. On those occasions when a confirmation of receipt is desired, a smart asset tag 610 may generate a random data handle to transmit with the data. A data foraging device 604 upon receiving a data message comprising the random data handle may store the random data handle until it has had an opportunity, as disclosed elsewhere herein, to communicate the data associated with the random data handle to a cloud server.

Upon receiving confirmation of receipt of the data by the cloud server, the data foraging device may broadcast the random data handle to alert the smart asset tag to the successful receipt of the associated data by the cloud server. The data foraging device may transmit the random data handle continuously, periodically, at scheduled intervals or as one of a list of random data handles that have been successfully communicated to the cloud server. The transmission of a particular random data handle by a data foraging device may be limited to a location near where the initial broadcast comprising the random data handle was received or may be location independent. A smart asset tag, upon receiving a random data handle associated with data that the smart asset tag is broadcasting, may then stop broadcasting that data. The smart asset tag may stop broadcasting completely, begin broadcasting new data to be communicated to the cloud server, accompanying the new data with a newly generated random data handle, or begin broadcasting generic information such as information regarding the type of asset to which it is attached, a unique ID, real time sensor data or the like as discussed elsewhere herein.

In other embodiments, rather than the smart asset tag 610 acting as a mobile beacon and the data foraging device 604 scanning for smart asset tags 610, a smart asset tag 610 may act as a Bluetooth master device with data foraging devices 604 acting as peripherals or slaves. In this embodiment, the smart asset tag 610 may scan, continuously, periodically, at scheduled intervals or when certain conditions are met for a data foraging device 604. Once a data foraging device 604 is identified, the smart asset tag 610 may connect to the data foraging device and briefly share data (bi directionally) before terminating the connection. Alternatively, the smart asset tag 610 may act a Bluetooth peripheral or slave and the data foraging device 604 may act as a Bluetooth master. In this embodiment, the data foraging device 604 may scan, periodically, continuously or at scheduled intervals, for a smart asset tag 610. Once a smart asset tag 610 is identified by the data foraging device 604, the data foraging device 604 may connect to the smart asset tag 610 and share informational data, settings, alarms, or the like (bi-directionally) briefly before terminating the connection. In this embodiment, the beacon comprises an optional receiver to receive shared informational data. Although Bluetooth wireless technology is used in described the above examples, other wireless technologies such as ANT Wi-Fi, ZigBee, IEEE 802.15.4, LoRa, Thread network protocol, and the like may be used.

In the above embodiments, the smart asset tag 610 may, upon successful communication with a data foraging device 604, turn off its wireless communication, thus saving power. The smart asset tag 610 may remain off until a state change (e.g. movement (detecting using an accelerometer or location beacon), temperature crossing a threshold, fall detection, gas over limit alert, change in location beacon, NFC activation, ambient light level, detection of the wearing of the PPE such as a mechanical contact switch that detects the wearing of a helmet, and the like) is detected. Upon detecting a state change, the smart asset tag 610 may attempt to connect to a data foraging device 604. The frequency of the connection attempts may be based on one or more of the detected state of the smart asset tag 610, how long since the last successful communication, and the like. For example, if an important state change is detected, the smart asset tag 610 may constantly scan until it finds a data foraging device 604 and is able to communicate the state change. For less important state changes, the smart asset tag 610 may only scan periodically for a data foraging device 604. However, once the data has been transmitted, the smart asset tag 610 may revert to a periodic or scheduled communication pattern until another state change is detected. This scheme may be beneficial with large-scale deployment of smart asset tags 610, such as when hundreds or thousands of smart asset tags 610 are present in a small area. Relative to smart asset tags 610 using a mobile beacon implementation, which may emit RF radiation on a regular basis, those embodiments where the smart asset tag 610 is emitting RF radiation only when connected to a data foraging device 604, may reduce potential interference as well as reducing possible burdens on the data foraging device 604 such as processing load, battery life, bandwidth, and the like.

In embodiments where the smart asset tags 610 act as Bluetooth masters, the smart asset tag 610 may be passively scanning for the presence of a data foraging device 604 rather than transmitting radio signals to facilitate detection of the smart asset tag 610 by the data foraging device 604. This communication topology may be beneficial when smart asset tags 610 are deployed in locations that limit or prohibit intentional RF radiation, such as onboard airplanes, in blasting areas, and other hazardous locations. Beacon-based smart asset tags 610 may require additional design elements such as a mechanism enabling the transceiver to be turned off in such hazardous locations, and the like.

Once data regarding the various assets 620 associated with the smart asset tags 610 have been uploaded to an asset management system 630, that data may be accessible by or downloadable to a supervisory application 642 which may be viewable by a supervisor 640. The supervisory application 642 may run on a computer, a laptop, a mobile device, a smart phone, a tablet or other device with, in embodiments, at least intermittent network connectivity and a display. The supervisory application 642 may allow a user, a supervisor 640 or other individual to review the uploaded data, edit the data, input instructions for various smart asset tags 610, input instructions for various assets 620, input instructions for data foraging applications 608, and the like.

In embodiments, an individual may request or otherwise indicate, using a supervisory application 642, an asset 620 to be brought in from the field. This may be an asset that is due for maintenance or an asset that is missing. The supervisory application 642 may instruct, via the asset management system 630, a data foraging application 608 to notify its user when it detects the asset to be brought in. Notification to the user may be a visual, auditory or haptic alert on the data foraging device 604. Notification to the user may be a visual, auditory or haptic alert on the smart asset tag 610 as discussed elsewhere herein. In addition to being requested by a user, the asset management system 630 may initiate a request for an asset to be brought in for maintenance, replacement, fitting, inventory verification purposes and the like.

In embodiments there may be various asset tag configurations (FIGS. 7A-7D). A smart asset tag 610 may be attached to an asset using an adhesive, mechanical means and the like. A smart asset tag 610 may be incorporated into an asset, such as a gas detector or other valuable piece of equipment. A smart asset tag 610A (FIG. 7A) may include a transceiver 710, a near field communication (NFC) tag 702, a low power battery 714, a processor and data storage 718. The NFC tag 702 may be used to share data with the data foraging device 604, downloading stored data to a dock or an upload location, and the like. The transceiver 710 may be a Bluetooth Low Energy transceiver configured to act as a beacon, scanner, BLE master, BLE peripheral and the like. The transceiver 710 may switch between roles. The transceiver 710 may broadcast data such as a unique item identifier or other information associated with the asset as described elsewhere herein. This format of smart asset tag may be approximately the diameter of a quarter and twice as thick.

In another embodiment (FIG. 7B) a smart asset tag 610B may include a transceiver 710, an NFC tag 702, a low power battery 714, a processor and data storage 718 and a user interface (UI) 704. The user interface 704 may include one or more of a visual alert (e.g. an LED light), a text display, an audio alert, a haptic alert and the like. When a data foraging device 604 receives a unique item identifier and other asset data from the transceiver 710, the data foraging application 608 may send the smart asset tag's unique item identifier 614 to a cloud server 618. The asset management system 630 on the cloud server 618 may look up the smart asset tag's unique item identifier 614 and determine commands for the smart asset tag 610B. For example, the asset management system 630 may indicate that maintenance is due on the asset associated with the smart asset tag 610B. This information may be transmitted back to one or more data foraging devices 604 in the vicinity of the smart asset tag 610B, which may result in a data foraging device 604 instructing the user interface 704 on the smart asset tag 610B to display an alert. This may provide visual notification to potential users of the asset associated with the smart asset tag 610B that it is not ready for use. Alternately, the message being broadcast by the transceiver 710 of a smart asset tag 610 may be updated to broadcast an error condition. Additionally, the user interface 704 may include a means for a user to acknowledge a message such as a button, toggle, touch sensor and the like. When a user acknowledges a message, this acknowledgement may be logged, may be broadcast by a transceiver 710 and thus sent back to the asset management system 630, and the like.

In another embodiment (FIG. 7C) a smart asset tag 610C may include a transceiver 710, a readable and writeable NFC tag 722, a low power battery 714 and a processor and data storage 718. The smart asset tag 610C may be on an asset 620, such as a durable piece of personal protective equipment, that uses a consumable 724, for example, a breathing apparatus may use a consumable filter, that should be replaced at periodic intervals, after a fixed period of time, after a cumulative exposure, and the like. When the consumable 724 is replaced in an asset 620, such as a durable PPE, an NFC tag on the consumable 724 may be linked to the readable/writeable NFC tag 722 on the durable piece of equipment. This may start a timer or countdown until the next required replacement of the consumable 724. Additionally, information regarding the type of consumable 724 (e.g. the type of filter in the breathing apparatus) may become associated with that piece of equipment.

In another embodiment (FIG. 7D) a smart asset tag 610D may include a transceiver 710, an NFC tag 702, a low power battery 714, a processor and data storage 718 and one or more sensors 712. The one or more sensors 712 may provide additional information to be relayed via the transceiver 710 or the NFC tag 702 back to the asset management system 630 on the cloud server 618. In an illustrative example, for equipment such as harnesses, the sensor 712 may be an accelerometer, which may record a sudden change in acceleration resulting from a fall. This information may be provided to the asset management system 630 on the cloud server 618. As a result of receiving this information, the asset management system 630 may mark the harness as due for maintenance or, if a number of falls or strength of deceleration is exceeded, indicate that it should be replaced. As a result of receiving this information, an investigation into the fall may be initiated. In another illustrative example, a safety helmet may include a smart asset tag 610D having an impact detector. Data regarding the impact may be conveyed to the data foraging device 604 via the transceiver 710 and from the data foraging application 608 to the asset management system 630. If the impact exceeded a threshold force, the helmet may no longer be considered safe and be marked for replacement. In some embodiments, the beacon's message may be altered to include information about the asset's state such as "Helmet in need of maintenance. Do not use." While four unique smart asset tag 610 configurations have been described, it should be understood that a smart asset tag may have, in addition to a transceiver 710, one or more of an NFC tag 702, a user interface (UI) 704, sensors 712, an acknowledgment button, a processor and data storage 718 and the like.

In embodiments, the smart asset tags 610, associated asset management system 630 and data foragers 602 may be used for tracking, in an ongoing manner, the location and availability of various assets. If an asset 620 is moved or lost, its last known location, the most recent location where a data foraging device 604 received a signal from the associated smart asset tag 610, may be easily retrieved using the supervisory application 642. The availability of various assets may be tracked as well. The percentage of a given PPE that is located in storage (not associated with a user and elsewhere in the facility) and within code (e.g. maintenance is up to date) may be easily determined.

In embodiments, the smart asset tags 610 may be used to promote compliance with safety regulations for an asset. When the data forager 602 or user uses a piece of protective equipment, the smart asset tag 610 may direct the user to videos showing instructions regarding the proper use of the asset. The instructions may be displayed on a data foraging device 604 in response to detecting the smart asset tag 610 on the asset. The user may touch a device to an NFC tag on the smart asset tag and access instructions in that manner.

In embodiments, the smart asset tags 610 and associated asset management system 630 may be used to facilitate asset 620 compliance, maintenance, calibration, replacement, recall and the like. The locations of assets 620 in need of services may be shown in the supervisory application 642. These assets 620 may be organized by due date, location grouping and the like. As a data foraging device 604 uploads the unique item identifier 614 and asset data, the asset management system 630 may cause the data foraging device 604 to send a signal to those smart asset tags 610 associated with assets 620 in need of maintenance, calibration, replacement and the like. In some embodiments, the signal may cause the transceiver to alter the message to include information about the asset's 620 state such as "Helmet in need of maintenance. Do not use." The signal sent to the smart asset tag 610 may cause an indicator to show on those smart asset tags 610 having a user interface 704. The indicator may draw a user's attention and, depending on the indication shown, a user may be informed that the asset is not to be used, that the asset should be taken to a service location, that the user should calibrate the asset prior to use and the like. In some cases, the user may be informed that maintenance should be performed on the asset in situ. The smart asset tag 610 may begin to broadcast maintenance or calibration instructions or the user may be able to touch a smart phone or other device to an NFC tag and download maintenance instructions in that manner.

In embodiments, smart asset tags 610 may be used to remotely monitor safety conditions. For example, upon detecting hazardous gas levels above some threshold, a smart asset tag 610 associated with, and possibly incorporated into the gas monitor, may scan for the presence of a data foraging device to send data regarding the hazardous gas levels to the asset management system 630.

In embodiments, smart asset tags 610 may be used to assure compliance with safety requirements such as a required asset 620, such as a required personal protective equipment (PPE), for entry into a restricted area in a facility, to work on certain equipment, and the like. With each smart asset tag 610 broadcasting information such as a unique item identifier 614 or item type, the presence of the required asset 620 (e.g. PPEs) may be confirmed and the user allowed to enter the area or start the equipment. The verification of the presence of the required asset 620 may include verification of the appropriate type of consumables 724 being deployed in the required asset 620 (e.g. the consumable 724 filter in a respirator is appropriate for the type of gases anticipated in the restricted area). If all of the required PPEs are not identified, or if one of them is indicated as out of maintenance, and the like the user may be kept from entering the area or using the piece of equipment.

As part of using the data from a plurality of smart asset tags 610 to assure the presence of required PPEs, it is important to ensure that all of the detected PPEs are being worn by a single individual. The asset management system 630 may compare the relative signal strength of a user ID tag and the signal strength and directional alignment of nearby smart asset tags 610. If the relative signal strength and alignment are consistent over time, the smart asset tags may be determined to be associated with personal protective equipment worn by the user identified by the user ID tag. In addition to signal strength and direction, other data from other sensors such as accelerometers, acoustic sensors, and the like may be compared and, if possible, commonalities in sensed data identified as confirmation that the plurality of smart asset tags are indeed associated with a single individual.

In embodiments, smart asset tags may be used to facilitate compliance with lone worker regulations. In lone worker situations, smart asset tags 610 such as those associated with a user's identification device and associated personal protective equipment may periodically establish contact with one or more data foraging devices 604, requesting that an "User Name/Equipment ID is OK and at Location X" message be communicated. These periodic updates may be part of a lone worker "check-in" system where, if "all is well" periodic messages are not received by the cloud server within a given time interval, an alert may be sent to the lone worker's supervisor. At the same time the request to send the "all is well" message is made, each contacted data foraging device 604 may be asked to respond to the requesting smart asset tag 610 with information regarding time since the data forager's last successful contact with the cloud server 618. Differences in connectivity to the cloud server 618 may be dependent on location, carrier, and the like. This information may be used to rank the local data foraging devices 604 on their expected connectivity to the cloud server 618. The more recent the last successful connection the higher a given data foraging device 604 may be ranked. A list of known local data foraging devices 604 having possible connectivity to the Internet, cloud, cellular network, etc. may be created.

When there is an alarm associated with a lone worker, (e.g. the lone user pushes a panic button, there is an alarm associated with a piece of PPE associated with the lone worker such as "man down" alarm, equipment alarms such as high gas, and the like) an alert may be sent through the known data foraging devices 604 to the cloud server 618. The known data foraging devices 604 may be contacted in the order of the expected connectivity to try to assure the fastest communication of the alert. Multiple data foraging devices 604 may communicate the data to the cloud. This may facilitate a degree of redundancy in the system such that when, for example, a lone worker is out of range of network communication a neighboring worker or data foraging device 604 may have network connectivity. The cloud server 618 may have a database or other associative method for identifying a human monitor assigned to the lone worker. If an alert is received the assigned monitor may be contacted either by text, phone and the like and provided with any known information on the lone worker such as location, what triggered the alarm (e.g. panic button or high gas concentration detected, and the like), environmental data such as gas levels, and the like. The assigned monitor may then assess the situation, coordinate response initiatives, and the like. In some embodiments, one or more users of known mobile devices may be alerted as well.

Data Foragers 602 may be motivated to wear the data foraging devices 604 using a variety of methods. It may be required as part of their job requirements. They may be given the opportunity to tag personal items as well as company inventory and thus gain the benefits of the system for their personal items (e.g. prescription safety glasses, keys, and the like).

In some embodiments, a beacon may be mobile and used for impact prevention. A beacon may be located on a mobile object, such as a vehicle, forklift, moving equipment, moving portions of equipment (e.g. a crane) and the like. There may be a plurality of beacons positioned at different locations on a moving object. A beacon may broadcast "Impact Danger" over an area associated with the leading edge of the mobile object when the object is in motion. Currently, there are audible back-up alerts on some vehicles, however, these may not be effective in a high noise environment. In this example, the beacon message, "Impact Danger," may be received by a receiving device that may emit a warning message audibly, visually, haptically, or combinations thereof. In embodiments, the beacon may be programmed with a range of relevance matching a desired impact warning distance. For example, for a relatively slow moving vehicle, the range of relevance may be small, but for a faster object, and perhaps bigger object with that is harder to stop easily, the range of relevance may be larger. In embodiments, the beacon may receive sensor data from a speedometer, either integral to or separate from the beacon. For example, above a particular sensed speed, the beacon may broadcast a message with one range of relevance while broadcasting a message with a different range of relevance below a particular sensed speed.

The system of beacons and receiving devices may facilitate responses to hazardous or emergency situations. Devices having the smart beacon application may communicate amongst themselves. In some hazardous environments, a piece of equipment such as a gas monitor or a user's identification device may periodically contact any local devices such as mobile phones, 4G tablets and the like having a cellular connection or any local device having a connection to an Internet connection, requesting that an "User Name/Equipment ID is OK and at Location X" message be communicated to a remote server. At the same time this request is made, each contacted local device may be asked to respond to the requesting device with information regarding time since the local device's last successful contact with the remote server. Differences in connectivity to the server may be dependent on location, carrier, and the like. This information may be used to rank the local devices on their expected connectivity to the remote server. The more recent the last successful connection the higher the local device may be ranked. A list of known local devices having possible connectivity to the Internet, cloud, cellular network, etc. may be created.

When a hazardous situation is detected, either through use of a panic button, "man down" alarm, equipment alarm such as high gas, and the like, an alert may be sent through the known local devices to the remote server. The known local devices may be contacted in the order of the expected connectivity to try to assure the fastest communication of the alert. The remote server may have a database or other associative method for identifying a human monitor assigned to a location. If an alert is received the assigned monitor may be contacted either by text, phone and the like and provided with any known information such as user, location, what triggered the alarm (e.g. panic button or high gas concentration detected, and the like), environmental data such as gas levels, and the like. The assigned monitor may then assess the situation, coordinate response initiatives, and the like. In some embodiments, one or more users of known mobile devices may be alerted as well.

In some embodiments, a gas detector may log data such as location, detected gases, gas concentrations, and user each time a new location beacon becomes the current site beacon. This information may be communicated in the event of a hazardous event as part of what is sent to the human monitor.

In embodiments, the beacon may be associated with or integrated with a network gateway device in a particular location so that the beacon broadcasts information and, in embodiments, responses to the information are sent to the cloud through the gateway. For example, the beacon may be used to broadcast that the location is a muster location, and once at the location, check-in of individuals at the muster location may proceed by the network gateway.

The methods and systems described herein may be deployed in part or in whole through a machine that executes computer software, program codes, and/or instructions on a processor. References to a "processor," "processing unit," "processing facility," "microprocessor," "co-processor" or the like are meant to also encompass more that one of such items being used together. The present invention may be implemented as a method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be or include a frequency division multiple access (FDMA) network or a code division multiple access (CDMA) network. The cellular network may include mobile devices, cell sites, base stations, repeaters, antennas, towers, and the like. The cell network may be one or more of GSM, GPRS, 3G, EVDO, mesh, or other network types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

The invention claimed is:

1. A system, the system comprising:
a receiving device associated with a user, the receiving device comprising:
a receiver adapted to receive a beacon broadcast from one or more of a plurality of beacons, the beacon broadcast comprising informational data and data regarding a range of relevance; and
a processor; and
an alarm,
wherein the processor makes a determination that the receiving device is within the range of relevance of a beacon of the plurality of beacons based on the data regarding the range of relevance, and wherein based on the determination, the alarm is activated.

2. The system of claim 1, wherein one of the plurality of the beacons is associated with a mobile object.

3. The system of claim 2, where the mobile object is one of a vehicle, a forklift, a piece of moving equipment, or a moving portion of a machine.

4. The system of claim 2, wherein the one of the plurality of beacons is located at a leading edge of the mobile object.

5. The system of claim 1, wherein the alarm is one or more of an audible notification, a visual notification, and a haptic notification.

6. A method, comprising:
receiving, on a receiver associated with a user, a beacon broadcast message comprising data regarding an impact danger and data regarding a range of relevance for the beacon broadcast message;
making a determination if the receiver associated with the user is within the range of relevance for the beacon broadcast message based on the data regarding the range of relevance; and
alerting, based on the determination, the user to the impact danger.

7. The method of claim 6, wherein alerting the user is accomplished using a haptic alert, an audible alert, a visual alert or a combination of visual, audible and visual alerts.

8. The method of claim 6, further comprising: broadcasting, using a beacon on a mobile object, a broadcast message comprising data regarding the impact danger and data regarding the range of relevance.

9. The method of claim 8, wherein the mobile object is one of a vehicle, a forklift, a piece of moving equipment, or a moving portion of a machine.

10. The method of claim 8, wherein the beacon is located at a leading edge of the mobile object.

11. A system, the system comprising:
a beacon associated with a mobile object, wherein the beacon broadcasts warning data about the mobile object and data regarding a range of relevance; and
a speedometer that senses a speed of the mobile object, wherein when the speedometer senses that the speed is above a threshold, the beacon broadcasts the warning data with data regarding a new range of relevance.

12. The system of claim 1, wherein the receiving device comprises the alarm.

13. The system of claim 1, wherein the alarm is separate from the receiving device.

* * * * *